US012709127B2

(12) United States Patent
Galasso et al.

(10) Patent No.: US 12,709,127 B2
(45) **Date of Patent: *Aug. 18, 2026**

(54) METHODS AND APPARATUS FOR VEHICLE SUSPENSION HAVING MULTIPLE GAS VOLUMES

(71) Applicant: Fox Factory, Inc., Duluth, GA (US)

(72) Inventors: Mario Galasso, Sandy Hook, CT (US); Joshua Benjamin Yablon, Oakland, CA (US); Andrew Laird, Seattle, WA (US); William M. Becker, Aptos, CA (US); Joseph Franklin, Vancouver, WA (US); Dennis K. Wootten, Milford, NH (US)

(73) Assignee: Fox Factory, Inc., Duluth, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,707

(22) Filed: Apr. 9, 2024

(65) Prior Publication Data

US 2024/0351390 A1 Oct. 24, 2024

Related U.S. Application Data

(60) Continuation of application No. 17/723,215, filed on Apr. 18, 2022, now Pat. No. 11,951,793, which is a (Continued)

(51) Int. Cl.
*B60G 13/10* (2006.01)
*B60G 11/27* (2006.01)

(Continued)

(52) U.S. Cl.
CPC ........... *B60G 17/052* (2013.01); *B60G 11/27* (2013.01); *B60G 13/10* (2013.01); *F15D 1/00* (2013.01);

(Continued)

(58) Field of Classification Search
CPC .... F15D 1/00; Y10T 137/87161; B62K 25/08

(Continued)

(56) References Cited

U.S. PATENT DOCUMENTS 1,281,079 A 10/1918 Sears
2,308,404 A 1/1943 Thornhill (Continued)

FOREIGN PATENT DOCUMENTS

EP 0855533 7/1998
EP 1655158 5/2006

(Continued)

OTHER PUBLICATIONS

European Search Report for EP Application No. 09166412, 7 pages, Mailed Nov. 4, 2009 (Nov. 4, 2009).

(Continued)

*Primary Examiner* — Robert A. Siconolfi
*Assistant Examiner* — James K Hsiao

(57) ABSTRACT

A method and apparatus for a vehicle suspension system gas spring. In one embodiment, a vehicle suspension system gas spring includes a compressible main gas chamber and an additional volume combinable with the main chamber to change a gas spring rate of the system. In one embodiment, a low friction piston seal is created by a flexible seal member.

10 Claims, 20 Drawing Sheets

Related U.S. Application Data division of application No. 16/453,474, filed on Jun. 26, 2019, now Pat. No. 11,312,203, which is a continuation of application No. 15/828,230, filed on Nov. 30, 2017, now Pat. No. 10,384,509, which is a continuation of application No. 14/848,947, filed on Sep. 9, 2015, now Pat. No. 9,855,812, which is a continuation of application No. 13/005,474, filed on Jan. 12, 2011, now Pat. No. 9,156,325, which is a continuation-in-part of application No. 12/717,867, filed on Mar. 4, 2010, now abandoned, which is a continuation-in-part of application No. 12/509,258, filed on Jul. 24, 2009, now Pat. No. 8,869,959, and a continuation-in-part of application No. 12/407,610, filed on Mar. 19, 2009, now Pat. No. 8,894,050.

(60) Provisional application No. 61/294,458, filed on Jan. 12, 2010, provisional application No. 61/227,775, filed on Jul. 22, 2009, provisional application No. 61/157,541, filed on Mar. 4, 2009, provisional application No. 61/038,015, filed on Mar. 19, 2008.

(51) Int. Cl.

*B60G 17/052* (2006.01)
*F15D 1/00* (2006.01)
*F16F 9/02* (2006.01)
*F16F 9/16* (2006.01)
*F16F 13/00* (2006.01)
*B62K 25/08* (2006.01)

(52) U.S. Cl.

CPC .............. *F16F 9/02* (2013.01); *F16F 9/0218* (2013.01); *F16F 9/16* (2013.01); *F16F 13/00* (2013.01); *B60G 2300/12* (2013.01); *B62K 25/08* (2013.01); *Y10T 137/87161* (2015.04)

(58) Field of Classification Search

USPC ........................................................ 267/64.11
See application file for complete search history.

(56) References Cited

U.S. PATENT DOCUMENTS 2,571,279 A 10/1951 Myklestad
2,881,467 A * 4/1959 Struhar .................... E05F 3/02 267/225
3,024,875 A 3/1962 Stultz
3,105,574 A 10/1963 Gunter et al.
3,123,347 A 3/1964 Stormer
3,173,671 A 3/1965 Broadwell
3,256,960 A 6/1966 Casimir
3,414,092 A 12/1968 Speckhart
3,469,661 A 9/1969 Lohr et al.
3,477,739 A 11/1969 White
3,525,512 A 8/1970 Hagwood
3,536,312 A 10/1970 Lohr
3,625,321 A 12/1971 Lutz
3,658,313 A 4/1972 Hahn
3,837,444 A 9/1974 Allinquant et al.
3,944,197 A 3/1976 Dachicourt
3,945,663 A 3/1976 Duckett
4,096,927 A 6/1978 Takatsu
4,122,923 A 10/1978 Ellis et al.
4,145,067 A 3/1979 Ceriani
4,303,231 A 12/1981 Reuschenbach et al.
4,453,638 A 6/1984 Wallace
4,560,042 A 12/1985 Sell et al.
4,749,068 A 6/1988 Sirven
4,762,308 A 8/1988 Geno
4,792,128 A 12/1988 Holley
4,813,519 A 3/1989 Matsubara et al.
4,877,223 A 10/1989 Hackett
4,880,213 A 11/1989 Shinbori et al.
4,881,750 A 11/1989 Hartmann et al.
4,915,364 A 4/1990 Perlini
4,958,706 A 9/1990 Richardson et al.
4,961,482 A 10/1990 Pohlenz et al.
4,972,928 A 11/1990 Sirven
4,993,693 A 2/1991 Lohr et al.
5,027,637 A 7/1991 Umetsu
5,078,241 A 1/1992 Ackermann et al.
5,080,392 A 1/1992 Bazergui
5,097,929 A 3/1992 Spoto
5,129,488 A 7/1992 Furuya et al.
5,157,806 A * 10/1992 Wartian .................. F16F 9/516 16/84
5,190,126 A 3/1993 Curnutt
5,207,300 A 5/1993 Engel et al.
5,220,706 A * 6/1993 Bivens ...................... E05F 3/02 267/225
5,246,761 A 9/1993 Sasaki
5,293,968 A 3/1994 Schuelke et al.
5,308,104 A 5/1994 Charles
5,417,446 A 5/1995 Pileggi et al.
5,449,189 A 9/1995 Chen
5,462,140 A 10/1995 Cazort et al.
5,509,674 A 4/1996 Browning
5,509,675 A 4/1996 Barnett et al.
5,511,811 A 4/1996 Pileggi
5,518,223 A 5/1996 Bivens
5,538,276 A 7/1996 Tullis
5,593,007 A 1/1997 Siltanen
5,649,692 A 7/1997 Gilsdorf et al.
5,725,226 A 3/1998 Cabrerizo-Pariente et al.
5,775,677 A 7/1998 Englund
5,862,895 A * 1/1999 Ricard ...................... F16F 9/43 188/289
5,992,585 A 11/1999 Kazmirski et al.
5,996,746 A 12/1999 Turner et al.
6,026,939 A 2/2000 Girvin et al.
6,062,352 A 5/2000 Shinozaki et al.
6,095,541 A 8/2000 Turner et al.
6,105,987 A 8/2000 Turner
6,105,988 A 8/2000 Turner et al.
6,135,434 A 10/2000 Marking
6,296,092 B1 10/2001 Marking et al.
6,311,962 B1 11/2001 Marking
6,318,525 B1 11/2001 Mgnocchi et al.
6,322,058 B1 11/2001 Tanigawa et al.
6,360,857 B1 3/2002 Fox et al.
6,371,263 B1 4/2002 Hoose et al.
6,415,895 B2 7/2002 Marking et al.
6,450,304 B1 9/2002 Miller et al.
6,464,212 B2 10/2002 Lutz
6,491,146 B1 12/2002 Yi et al.
6,520,524 B1 2/2003 Costa
6,543,754 B2 4/2003 Ogura
6,581,919 B2 6/2003 Barefoot et al.
6,581,948 B2 6/2003 Fox
6,592,136 B2 * 7/2003 Becker ...................... F16F 9/44 188/282.1
6,604,751 B2 8/2003 Fox
6,637,555 B2 10/2003 Miller et al.
6,695,105 B2 2/2004 Toiyama
6,752,388 B2 6/2004 Thurow et al.
6,782,980 B2 8/2004 Nakadate
6,915,885 B2 7/2005 Förster
6,923,433 B2 8/2005 Gross et al.
6,938,887 B2 9/2005 Achenbach
6,978,872 B2 12/2005 Turner
7,000,907 B2 2/2006 Achenbach
7,066,455 B2 * 6/2006 Adoline .................. F16F 1/128 267/168
7,083,163 B2 8/2006 Lemmens et al.
7,128,192 B2 10/2006 Fox
7,195,234 B2 3/2007 Jordan et al.
7,261,194 B2 8/2007 Fox
7,273,137 B2 9/2007 Fox
7,281,704 B2 * 10/2007 Salice ...................... E05F 5/02 188/297
7,299,908 B2 11/2007 Achenbach

(56) References Cited

U.S. PATENT DOCUMENTS 7,308,976 B2 12/2007 Turner
7,374,028 B2 5/2008 Fox
7,410,154 B2* 8/2008 Lam ........................ F16F 9/512 267/221
7,413,064 B2 8/2008 Furuya et al.
7,441,638 B2 10/2008 Hanawa
7,641,028 B2* 1/2010 Fox ........................ F16F 9/0236 188/278
7,657,970 B2* 2/2010 Artsiely .................... E05F 5/02 16/85
7,703,585 B2 4/2010 Fox
7,810,826 B2 10/2010 Mcandrews et al.
8,051,534 B1 11/2011 Luca
8,118,144 B2 2/2012 Turner et al.
8,123,006 B1 2/2012 Schroeder et al.
8,167,328 B2 5/2012 Powell et al.
8,256,787 B2 9/2012 Inoue et al.
8,276,719 B2 10/2012 Trujillo et al.
8,356,386 B2* 1/2013 Liao .......................... E05F 3/02 16/84
8,403,115 B2 3/2013 Gartner et al.
8,464,850 B2 6/2013 Fox
8,528,708 B2* 9/2013 Sakai .................... F16F 9/0218 188/322.18
8,672,106 B2 3/2014 Laird et al.
8,800,973 B2 8/2014 Pelot et al.
8,844,895 B2* 9/2014 Palma ..................... E05C 17/30 248/200.1
8,869,959 B2 10/2014 Yablon et al.
8,894,050 B2* 11/2014 Wootten .................. F16F 9/486 267/64.18
8,959,710 B2 2/2015 Wach et al.
8,960,389 B2 2/2015 Mcandrews
9,132,881 B2 9/2015 Kwaterski
9,156,325 B2 10/2015 Galasso et al.
9,175,740 B2 11/2015 Cultraro
9,186,950 B2 11/2015 Wootten et al.
9,188,188 B2* 11/2015 Yablon ...................... F16F 9/48
9,428,029 B2 8/2016 Job
9,688,347 B2* 6/2017 Yablon ...................... F16F 9/48
9,707,817 B1 7/2017 Arnott et al.
9,714,093 B2* 7/2017 Cuddy ...................... F16F 9/19
9,731,574 B2* 8/2017 Barefoot ................ B60G 15/12
9,797,467 B2 10/2017 Wootten et al.
9,855,812 B2 1/2018 Franklin et al.
10,221,914 B2 3/2019 Yablon et al.
10,408,295 B2 9/2019 Wootten et al.
10,612,618 B2 4/2020 Yablon et al.
10,683,033 B2* 6/2020 Shepherd ............... B62D 7/228
10,746,251 B2* 8/2020 Ruan ..................... F16F 15/022
11,181,163 B2 11/2021 Wootten et al.
11,236,797 B2* 2/2022 Bandy ................... F16F 9/0236
11,313,433 B2* 4/2022 Chang ................... F16F 15/022
11,332,190 B1* 5/2022 Shepherd .............. F16F 9/0209
11,370,261 B2* 6/2022 Laird ........................ F16F 9/46
2002/0108825 A1 8/2002 Miller et al.
2002/0121416 A1 9/2002 Katayama et al.
2002/0175035 A1 11/2002 Achenbach
2002/0190445 A1 12/2002 Achenbach et al.
2003/0029684 A1 2/2003 Forster
2003/0034596 A1 2/2003 Barefoot et al.
2003/0047398 A1 3/2003 Toiyama
2003/0132073 A1 7/2003 Nakadate
2003/0173723 A1 9/2003 Behmenburg et al.
2003/0234144 A1 12/2003 Fox
2004/0020730 A1* 2/2004 Turner ...................... F16F 9/46 188/322.13
2004/0150143 A1 8/2004 Zimmer et al.
2005/0062249 A1 3/2005 Lemmens et al.
2005/0116399 A1 6/2005 Jordan et al.
2006/0011432 A1 1/2006 Turner et al.
2006/0065496 A1 3/2006 Fox et al.
2006/0090973 A1 5/2006 Potas et al.
2006/0124414 A1 6/2006 Hanawa
2006/0266602 A1 11/2006 Robertson
2006/0289258 A1 12/2006 Fox
2007/0007743 A1 1/2007 Becker et al.
2007/0012531 A1 1/2007 Fox et al.
2007/0057420 A1 3/2007 Jordan et al.
2007/0068751 A1 3/2007 Fox et al.
2007/0119670 A1 5/2007 Fox
2007/0119672 A1 5/2007 Becker
2007/0158927 A1 7/2007 Fox
2007/0227844 A1 10/2007 Fox
2007/0227845 A1 10/2007 Fox
2007/0228690 A1 10/2007 Fox
2007/0228691 A1 10/2007 Fox
2007/0262555 A1 11/2007 Fox
2007/0296163 A1 12/2007 Fox
2008/0007017 A1 1/2008 Fox
2008/0023935 A1 1/2008 Mcandrews et al.
2008/0035439 A1 2/2008 Fox
2008/0053767 A1 3/2008 Fox
2008/0053768 A1 3/2008 Fox
2008/0106012 A1 5/2008 Turner et al.
2008/0116622 A1 5/2008 Fox
2008/0296814 A1 12/2008 Franklin et al.
2009/0001684 A1 1/2009 Mcandrews et al.
2009/0140475 A1 6/2009 Turner et al.
2009/0236807 A1 9/2009 Wootten et al.
2009/0277732 A1 11/2009 Trujillo et al.
2010/0044975 A1* 2/2010 Yablon ................... B60G 17/08 188/282.8
2010/0213656 A1 8/2010 Patil et al.
2010/0244340 A1 9/2010 Wootten et al.
2011/0215551 A1 9/2011 Galasso et al.
2012/0325605 A1 12/2012 Talavasek et al.
2013/0134687 A1 5/2013 Laird et al.
2014/0246817 A1 9/2014 Bounds
2014/0353100 A1 12/2014 Wootten et al.
2015/0100206 A1 4/2015 Galasso et al.
2015/0210138 A1 7/2015 Job
2015/0224845 A1* 8/2015 Anderson ................. F03G 7/08 701/37
2016/0003321 A1* 1/2016 Wootten ............... B60G 17/048 188/313
2016/0052590 A1 2/2016 Yablon et al.
2017/0182859 A1* 6/2017 Anderson ............ B60G 17/019
2017/0284499 A1 10/2017 Yablon et al.
2018/0038444 A1 2/2018 Wootten et al.
2018/0086170 A1 3/2018 Galasso et al.
2019/0195309 A1 6/2019 Yablon et al.
2019/0337348 A1* 11/2019 Venton-Walters .......................... B60G 17/0408
2023/0051485 A1* 2/2023 Ratcliff ................. F16F 9/0281

FOREIGN PATENT DOCUMENTS

GB 942328 11/1963
GB 1099734 A 1/1968
GB 1500714 A 2/1978
JP 2006177493 A 7/2006

OTHER PUBLICATIONS

European Search Report for EP Application No. 12174239, 8 pages, Mailed Nov. 22, 2012 (Nov. 22, 2012).
European Exam Report for EP Application No. 12174239, 6 pages, Mailed May 25, 2018, May 25, 2018.

* cited by examiner

METHODS AND APPARATUS FOR VEHICLE SUSPENSION HAVING MULTIPLE GAS VOLUMES

CROSS-REFERENCE TO RELATED APPLICATIONS

This application claims priority to and is a continuation of the co-pending patent application, U.S. patent application Ser. No. 17/723,215, filed on Apr. 18, 2022, entitled "METHODS AND APPARATUS FOR VEHICLE SUSPENSION HAVING MULTIPLE GAS VOLUMES", by Mario Galasso et al., and assigned to the assignee of the present invention, the disclosure of which is hereby incorporated herein by reference in its entirety.

The U.S. patent application Ser. No. 17/723,215 claims priority to and is a divisional of the patent application, U.S. patent application Ser. No. 16/453,474, filed on Jun. 26, 2019, now U.S. Issued U.S. Pat. No. 11,312,203, entitled "METHODS AND APPARATUS FOR VEHICLE SUSPENSION HAVING MULTIPLE GAS VOLUMES", by Mario Galasso et al., and assigned to the assignee of the present invention, the disclosure of which is hereby incorporated herein by reference in its entirety.

The U.S. patent application Ser. No. 16/453,474 claims priority to and is a continuation of the patent application, U.S. patent application Ser. No. 15/828,230, filed on Nov. 30, 2017, now U.S. Pat. No. 10,384,509, entitled "METHODS AND APPARATUS FOR VEHICLE SUSPENSION HAVING MULTIPLE GAS VOLUMES", by Mario Galasso et al., and assigned to the assignee of the present invention, the disclosure of which is hereby incorporated herein by reference in its entirety.

The U.S. patent application Ser. No. 15/828,230 claims priority to and is a continuation of the patent application, U.S. patent application Ser. No. 14/848,947, filed on Sep. 9, 2015, now U.S. Pat. No. 9,855,812, entitled "METHODS AND APPARATUS FOR VEHICLE SUSPENSION HAVING MULTIPLE GAS VOLUMES", by Mario Galasso et al., and assigned to the assignee of the present invention, the disclosure of which is hereby incorporated herein by reference in its entirety.

The U.S. patent application Ser. No. 14/848,947 claims priority to and is a continuation of the patent application, U.S. patent application Ser. No. 13/005,474, filed on Jan. 12, 2011, now U.S. Pat. No. 9,156,325, entitled "METHODS AND APPARATUS FOR VEHICLE SUSPENSION HAVING MULTIPLE GAS VOLUMES", by Mario Galasso et al., and assigned to the assignee of the present invention, the disclosure of which is hereby incorporated herein by reference in its entirety.

The U.S. patent application Ser. No. 13/005,474 is a continuation-in-part application of and claims the benefit of U.S. patent application Ser. No. 12/717,867, filed on Mar. 4, 2010, now abandoned, entitled "METHODS AND APPARATUS FOR COMBINED VARIABLE DAMPING AND VARIABLE SPRING RATE SUSPENSION" by Dennis K. Wootten et al., and assigned to the assignee of the present application, which is incorporated herein, in its entirety, by reference.

The U.S. patent application Ser. No. 12/717,867 claims priority to and benefit of U.S. Provisional Patent Application No. 61/157,541, filed on Mar. 4, 2009, entitled "METHODS AND APPARATUS FOR COMBINED VARIABLE DAMPING AND VARIABLE SPRING RATE SUSPENSION" by Dennis K. Wootten et al., which is incorporated herein, in its entirety, by reference.

The U.S. patent application Ser. No. 12/717,867 is a continuation-in-part application of and claims the benefit of U.S. patent application Ser. No. 12/509,258, filed on Jul. 24, 2009, and is now issued U.S. Pat. No. 8,869,959, entitled "VEHICLE SUSPENSION DAMPER" by Joshua Benjamin Yablon et al., and assigned to the assignee of the present application, which is incorporated herein, in its entirety, by reference.

The U.S. patent application Ser. No. 12/509,258 claims priority to and benefit of U.S. Provisional Patent Application No. 61/227,775, filed on Jul. 22, 2009, entitled "VEHICLE SUSPENSION DAMPER" by Joshua Benjamin Yablon et al., which is incorporated herein, in its entirety, by reference.

The U.S. patent application Ser. No. 12/717,867 is a continuation-in-part application of and claims the benefit of U.S. patent application Ser. No. 12/407,610, filed on Mar. 19, 2009, and is now issued U.S. Pat. No. 8,894,050, entitled "METHODS AND APPARATUS FOR SUSPENDING VEHICLES" by Dennis K. Wootten et al., and assigned to the assignee of the present application, which is incorporated herein, in its entirety, by reference.

The U.S. patent application Ser. No. 12/407,610 claims priority to and benefit of U.S. Provisional Patent Application No. 61/038,015, filed on Mar. 19, 2008, entitled "METHODS AND APPARATUS FOR SUSPENSION VEHICLES USING MULTIPLE FLUID VOLUMES" by Dennis K. Wootten et al., which is incorporated herein, in its entirety, by reference.

The U.S. patent application Ser. No. 12/407,610 claims priority to and benefit of U.S. Provisional Patent Application No. 61/157,541, filed on Mar. 4, 2009, entitled "METHODS AND APPARATUS FOR COMBINED VARIABLE DAMPING AND VARIABLE SPRING RATE SUSPENSION" by Dennis K. Wootten et al., which is incorporated herein, in its entirety, by reference.

The U.S. patent application Ser. No. 13/005,474 is a continuation-in-part application of and claims the benefit of U.S. patent application Ser. No. 12/407,610, filed on Mar. 19, 2009, and is now issued U.S. Pat. No. 8,894,050, entitled "METHODS AND APPARATUS FOR SUSPENDING VEHICLES" by Dennis K. Wootten et al., and assigned to the assignee of the present application, which is incorporated herein, in its entirety, by reference.

The U.S. patent application Ser. No. 12/407,610 claims priority to and benefit of U.S. Provisional Patent Application No. 61/038,015, filed on Mar. 19, 2008, entitled "METHODS AND APPARATUS FOR SUSPENSION VEHICLES USING MULTIPLE FLUID VOLUMES" by Dennis K. Wootten et al., which is incorporated herein, in its entirety, by reference.

The U.S. patent application Ser. No. 12/407,610 claims priority to and benefit of U.S. Provisional Patent Application No. 61/157,541, filed on Mar. 4, 2009, entitled "METHODS AND APPARATUS FOR COMBINED VARIABLE DAMPING AND VARIABLE SPRING RATE SUSPENSION" by Dennis K. Wootten et al., which is incorporated herein, in its entirety, by reference.

The U.S. patent application Ser. No. 13/005,474 claims priority to and benefit of U.S. Provisional Patent Application No. 61/294,458, filed on Jan. 12, 2010, which is incorporated herein, in its entirety, by reference.

BACKGROUND OF THE INVENTION

Field of the Invention

Embodiments of the present invention generally relate to a gas spring for use in a vehicle suspension system.

Description of the Related Art

Gas springs are typically utilized in suspension systems with dampers. The dampers provide a damping function as fluid is metered through a piston while the gas spring, with its compressible gas provides a typically non-linear reaction as the suspension system moves through a compression stroke. Gas volume is one aspect that enters into the design of a gas spring. A larger volume can mean a longer stoke of a piston in a gas spring before the spring becomes too "stiff" due to compression. Unfortunately a spring having a large initial gas volume also yields a very low spring force, hence too compliant, through a significant portion of a compression stroke. What is needed is a gas spring having a variable volume gas chamber.

SUMMARY OF THE INVENTION

The present invention generally relates to a vehicle suspension system gas spring. In one embodiment, a vehicle suspension system gas spring includes a compressible main gas chamber and an additional volume combinable with the main chamber to change a gas spring rate of the system. In one embodiment, a low friction piston seal is created by a flexible seal member.

BRIEF DESCRIPTION OF THE DRAWINGS

So that the manner in which the above recited features can be understood in detail, a more particular description of the invention, briefly summarized above, may be had by reference to embodiments, some of which are illustrated in the appended drawings. It is to be noted, however, that the appended drawings illustrate only certain embodiments of this invention and are therefore not to be considered limiting of its scope, for the invention may admit to other equally effective embodiments.

FIG. 6 further illustrates a gas chamber fill valve assembly.

DETAILED DESCRIPTION

Figure 1:
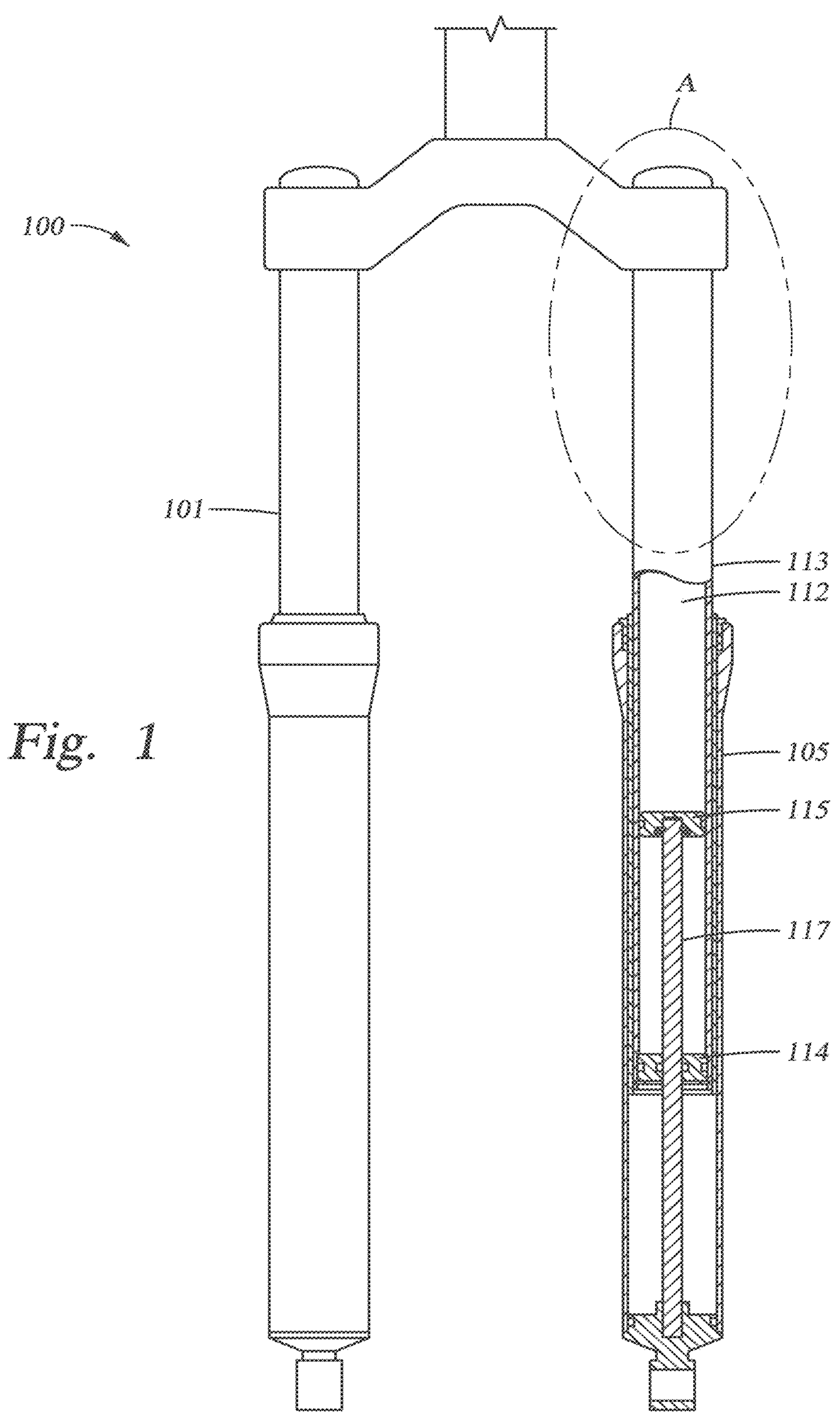
FIG. 1 is a partial section view of a fork assembly showing a damper leg and a gas spring leg, the gas spring leg illustrating a typical location for embodiments described herein.

One embodiment herein comprises a gas spring shock absorber for a vehicle. In one embodiment, the vehicle is a bicycle and the gas spring is disposed in a front fork of the bicycle. FIG. 1 is a section view of a fork assembly 100 showing a damper leg 101 and a gas spring leg 105. The gas spring leg includes a gas or air chamber 112 with a gas spring piston 115 disposed on a rod 117 which extends through a bulkhead or pressure head 114. In an upper portion of an upper tube 113 and labeled as "A" is an assembly (not shown) constructed and arranged to selectively provide an additional volume to the main gas chamber 112. In one embodiment, the additional volume comprises a secondary gas chamber. Various embodiments of the assembly will be disclosed herein. The assembly is often located in an upper portion of the gas spring leg 105 in order to permit adjustment and manipulation by a user; however other embodiments will also be described herein.

As the gas in the primary gas spring chamber 112 is compressed operating on only its single volume, its pressure is characteristically exponential and therefore increasing more rapidly through the latter half of the compression stroke. The force (corresponding to pressure acting over the given piston area) versus the linear travel of the piston in the main gas chamber is not linear. While the curve approximates linearity through about the first 50% of travel the later portion of the stroke exhibits non-linearly increasing pressure. At greater travel (compression stroke) values the rate of increase of the force (pressure) for incrementally further travel is exponential and the shock absorber is therefore increasingly much more rigid in the last third of its stroke. Embodiments described herein extend the substantially linear portion of the spring rate curve beyond that available with a single gas chamber spring.

In certain embodiments there are several shock absorber parameters that can be varied in order to derive a preferred travel versus pressure profile, or "spring rate" over the range of travel. Variables that may be selectively altered include: length and diameter of a primary or main gas chamber, volume of a secondary chamber, initial pressure state of the primary chamber, and initial pressure state of the secondary chamber.

The initial pressure state of the primary chamber help define the shape of the travel versus spring pressure profile for the shock absorber. Preferably the initial pressure value chosen results in a substantially linear spring rate for a substantial portion of the fork travel (e.g. 50%+). In one embodiment of a gas spring having a selectively communicable secondary chamber, the initial pressure in the secondary chamber is set to equal a pre-calculated pressure in the primary chamber corresponding to a point just before the main spring gas compression profile begins to become observably exponential. When the communication valve is opened with such secondary chamber pressure setting, there is no significant differential pressure between the primary and secondary chambers. Further, there is no significant system pressure drop when the primary and secondary chambers are fluidly communicated. The gas spring volume is however increased by the amount of the secondary chamber and the spring rate is correspondingly decreased. The transition from the spring rate associated with only the primary chamber to the spring rate associated with the combined primary and secondary chambers is relatively smooth.

In one embodiment, the initial pressure in the secondary chamber may be set at the same time as the initial pressure in the primary chamber and at the same pressure. During an initial compression of the shock absorber the volume of the primary chamber volume is reduced and the pressure in the primary chamber rises until a communication valve between the primary and a secondary chamber is opened. Because the secondary chamber pressure is still at its initial pressure setting, corresponding to the primary chamber initial setting, fluid flows from the now elevated pressure primary chamber, through the communication valve into the secondary chamber when the communication valve is opened. The pressure in the now combined primary and secondary chambers equalizes at a pressure value between the pre-communication primary chamber pressure and the initial secondary chamber pressure (equalization pressure is dependent on the volume ratio between the primary and secondary chambers). Following that combination and equalization the slope of the spring rate for the combined chambers is more gradual. During subsequent compression cycles of the shock absorber, the secondary chamber retains the "at communication" compression pressure of the primary chamber as a set point and no further equalization occurs upon opening the communication valve.

In one embodiment, a pressure regulator is positioned between the primary and secondary chambers and maintains a predetermined differential pressure between the two chambers when the communication valve is closed.

Variable volume gas springs are disclosed in US Patent Application Publication Nos. 2009/0236807 A1 (application Ser. No. 12/407,610); 2003/0234144 A1 (application Ser. No. 10/237,333); 2008/0116622 A1 (application Ser. No. 11/560,403); and 2008/0296814 A1 (application Ser. No. 12/176,160), each of which is incorporated herein, in its entirety, by reference. As used herein, "air" and "gas" may be used to designate any suitable gaseous phase fluid. "Up", "down", "Upward" and "downward" are used herein to designate relatively opposite directions, usually of movement.

Figure 2A:
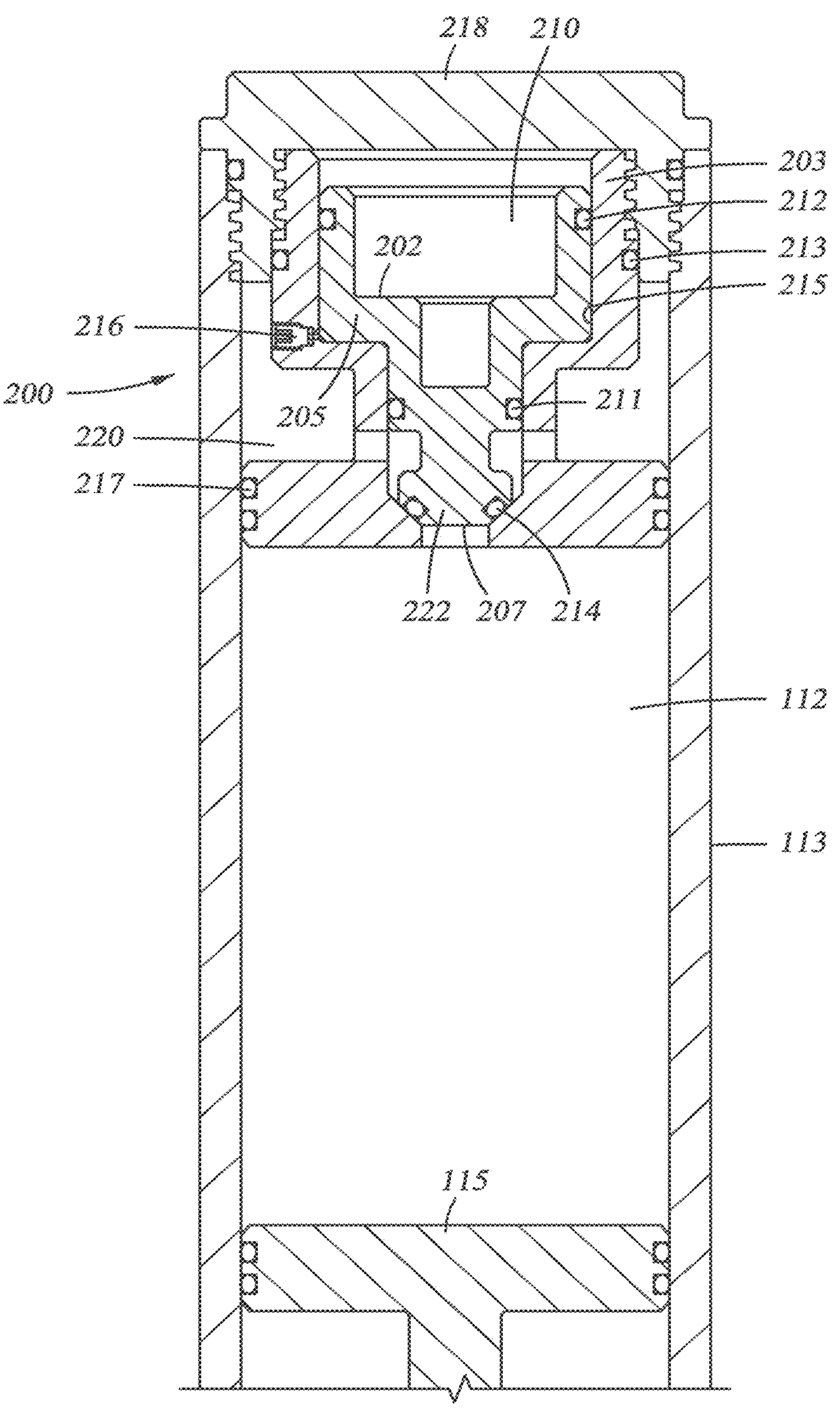
FIG. 2A is a gas spring with a valve disposed in an upper end thereof and FIG. 2B is a view of the valve of FIG. 2A, shown in an open position.

Referring to FIG. 2A, a sectional view of one embodiment of portion 'A' of the gas sprung vehicle shock absorber (or gas spring fork leg) of FIG. 1 is shown. Illustrated is a main gas chamber 112 with a gas piston 115 shown in a retracted position. A valve 200 is located opposite the piston 115 and includes a movable valve piston 205 with an upper area 202 defined by an upper O-ring seal 212 and a lower area 207 defined by lower O-ring seal 214. A secondary gas chamber 220 is formed annularly around the valve piston 205 and is bounded by another set of O-rings 213, 217. Secondary gas chamber 220 is for selective use in order to additively enlarge the size of the main gas chamber 112 as described below. Valve 200 is retained in cylindrical tube 113 with threads between the valve body 203 and a threaded cap 218, an outer surface of which is threaded into an upper end of the tube 113.

In one embodiment, the upper piston area 202 is larger than the lower area 207 and is acted upon by a valve gas chamber 210 formed above the upper area. Due to the differences between piston surface areas, the valve piston 205 can be in a balanced state when main gas chamber 112 pressure is higher than valve gas chamber 210 pressure. Additionally, an isolated area 215 is defined between upper O-ring 212 and an intermediate O-ring 211, sealing the valve piston 205 within the valve body 203. Area 215 will typically include gas at atmospheric pressure (versus the often higher pressures of chambers 112, 210 and 220) and will resist any movement of valve piston 205 that increases the volume of area 215. A bleed valve or port 216 is installed adjacent isolated area 215 to facilitate assembly of the valve 200 by allowing evacuation of gas from chamber 215 during assembly.

Figure 2B:
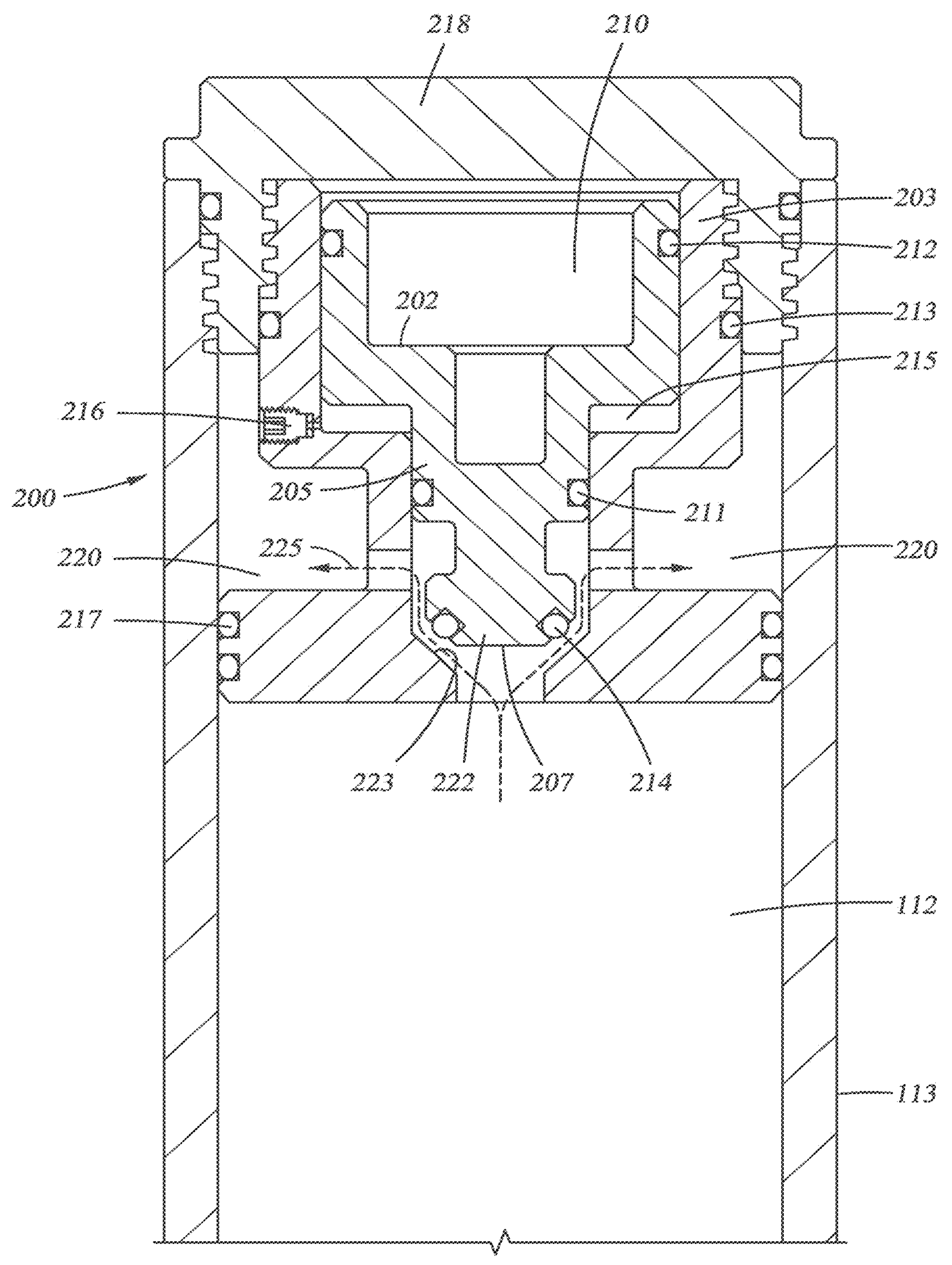

When pressure in the main gas chamber 112 becomes high enough, due to compression of the fork and hence the main gas chamber of the gas spring, the net force on the lower area 207 of the valve piston 205 becomes greater than the net force on the upper area 202 of the piston 205 (which equals the valve gas chamber pre-charge pressure multiplied times the upper area), and any resistance contributed by the potential axial expansion of isolated area 215. At that point, the valve piston 205 is moved upwardly, thereby exposing secondary gas chamber 220 to the main gas chamber 112. FIG. 2B illustrates the valve in the open position which will take place at some point during a compression stroke of main gas piston 115 (not shown in 2B). As shown, a lower end 222 of the valve piston 205 is moved off a seat 223 formed in the valve body and a fluid path 225 is formed between the chambers 112, 220. Such fluid communication results in an increased fork leg air spring (or gas) volume and therefore a reduced, or more linear, effective spring rate.

Initially the valve gas chamber 210 is configured with a gas pressure as desired to permit opening of the valve 200 at a predetermined point in the compression of the main gas chamber 112. While the initial charge of the secondary gas chamber 220 can be preset, it is not necessary. Once the valve piston 205 has cycled open during compression, the pressure of the main gas chamber 112 at the predetermined compression point will be introduced into the secondary gas chamber 220. During extension of the fork (e.g. rebound and decompression) the valve piston 205 will close when the pressure of the main chamber 112 becomes insufficient to continue to overcome the net force on the upper area 202 (accounting also for the force due to chamber 215) of the valve piston 205. Closure of the valve piston 205 will trap the pressure of the main chamber 112 in the secondary chamber 220 at a value of pressure that existed at the time of closure. Subsequent cycles will operate consistently because the pressure in the main and secondary chambers 112, 220 will be substantially the same at the point of subsequent valve openings.

Figure 3A:
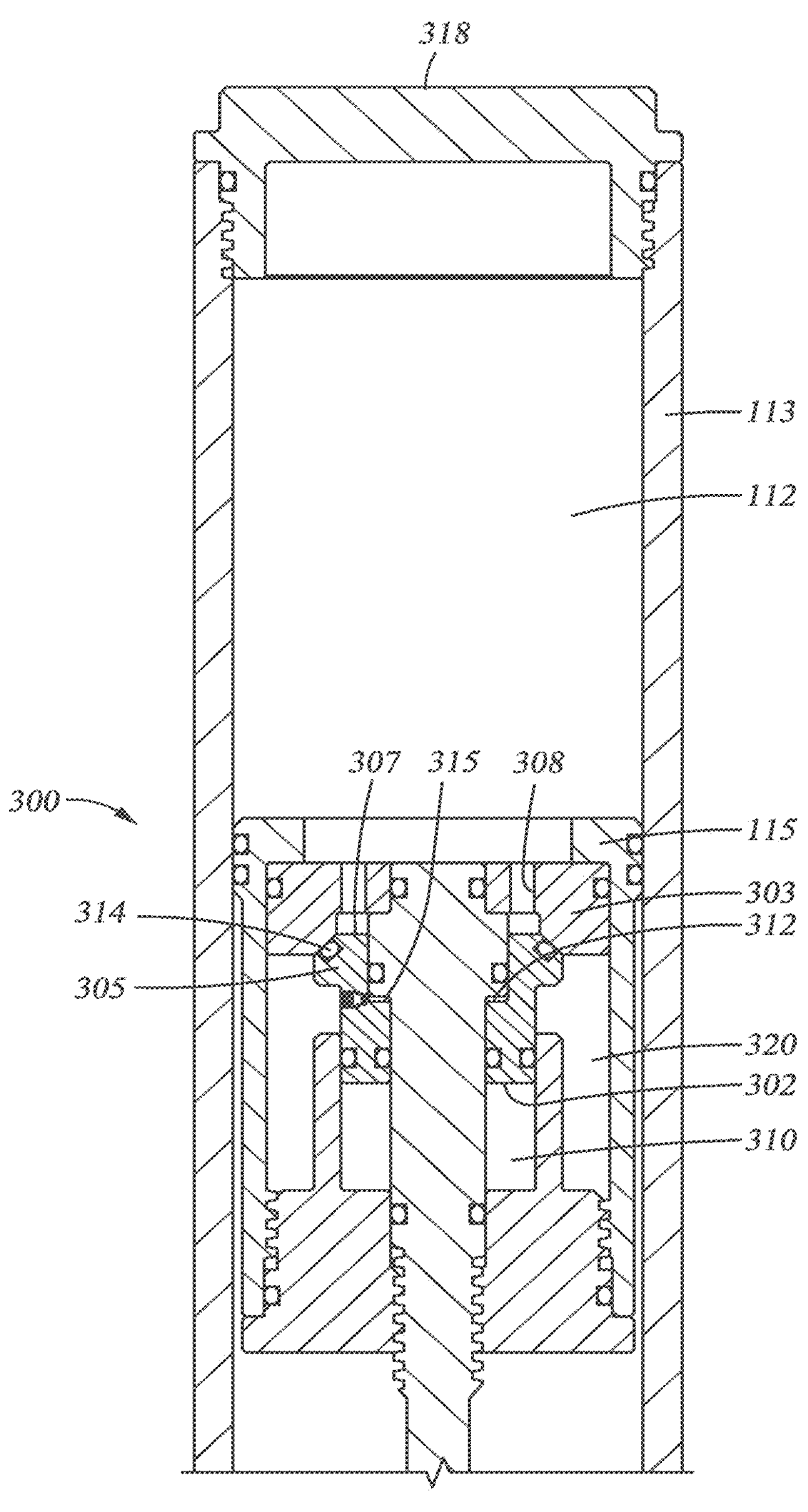
FIGS. 3A and 3B show another embodiment of a gas spring valve, disposed in a gas spring piston and shown in two different positions.
Figure 3B:
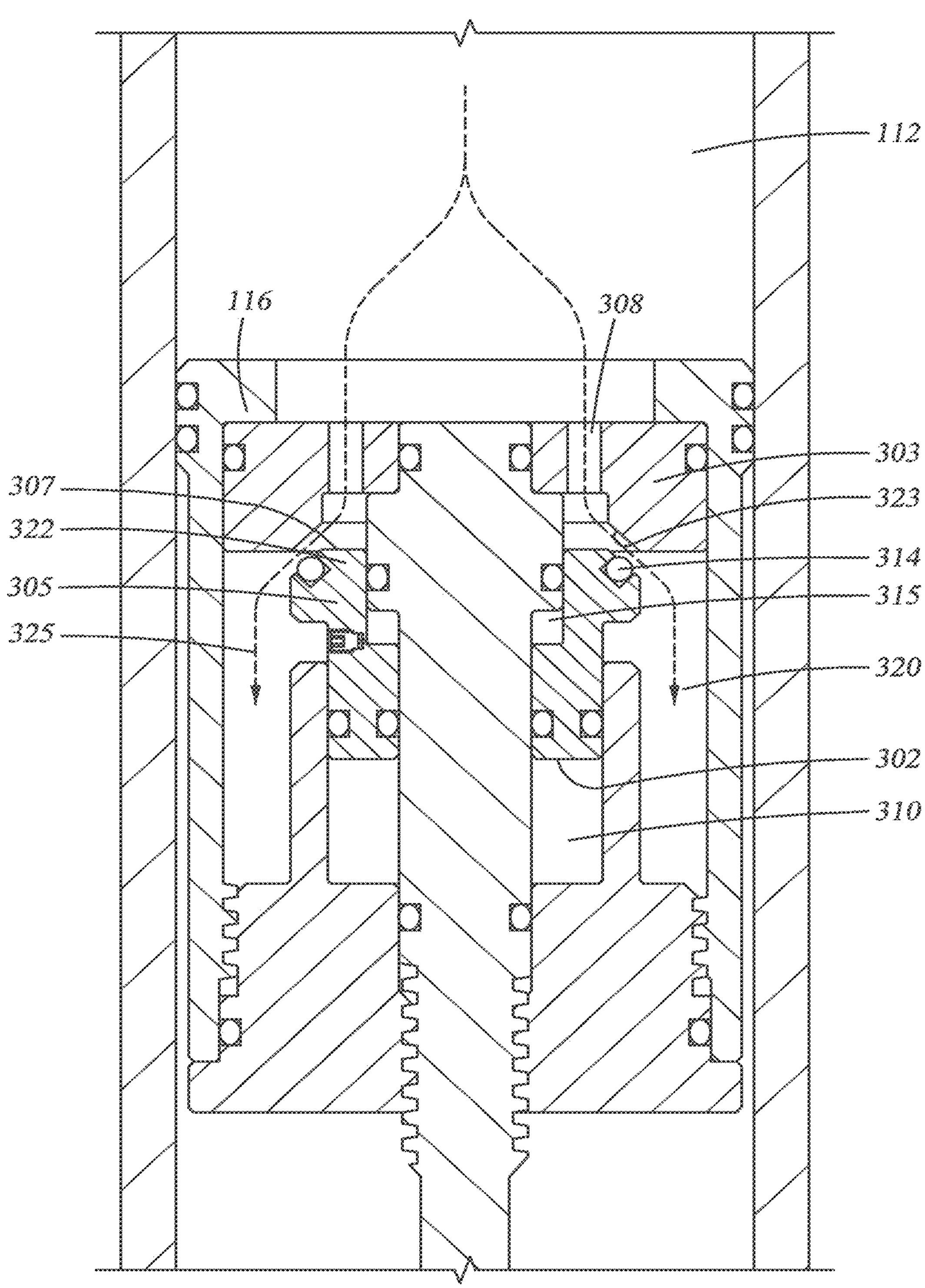

FIGS. 3A and 3B show another arrangement that is operationally similar to the arrangement of FIGS. 2A, B but where the secondary chamber and communication valve are included with the compression piston versus the top cap area. The FIGS. 3A, 3B show a gas spring with a threaded cap 318 in an upper end of a tube 113 and a piston/rod assembly in a lower end of the tube as it would appear prior to a compression stroke. In the embodiment of FIGS. 3A, B the valve arrangement is configured as part of the gas spring piston 115 (as opposed to the piston of FIG. 1, for example)

and the valve assembly moves with the piston 115 into the gas chamber 112 during a compression stroke of the gas spring. As shown in FIG. 3A (and referencing FIG. 1 for analogous "upper" and "lower" areas) the main chamber 112 is above the valve 300. The valve piston 305 is annular and includes a larger "upper" annular area 302 on its lower end and a smaller "lower" annular area 307 on its upper end. In the embodiment shown, area 307 is accessed through some number of ports 308 formed in a head piece 303 of the gas piston 115.

Operationally, the valve piston 305 and its upper and lower areas 302, 307 communicate a secondary gas chamber 320 with the main gas chamber 112 at a predetermined point in the compression of the main gas chamber and based on the preset gas pressure of a valve gas chamber 310. FIG. 3B shows the device in an "open" position with end 322 of the valve piston 305 moved off a seat 323, thereby permitting fluid communication (shown by arrow 325) between the main 112 and secondary 320 gas chambers. As with the valve of FIGS. 2A, B, the valve operates to increase the gas volume of the spring when pressure acting upon piston area 307 overcomes pressure in piston area 302 plus any resistance brought about by the expansion of an isolated area 315.

Figure 4:
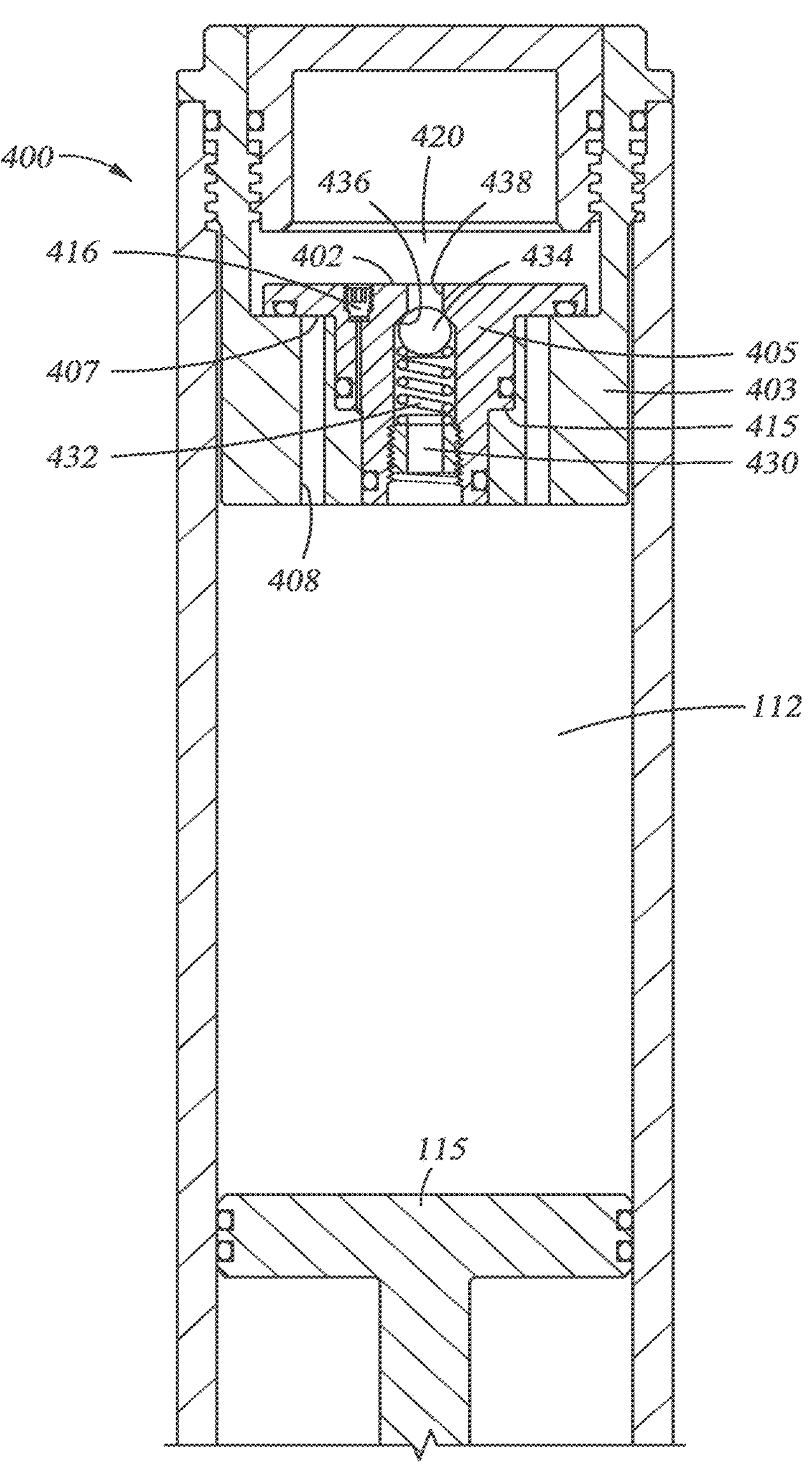
FIG. 4 is another embodiment of a gas spring valve.
Figure 5:
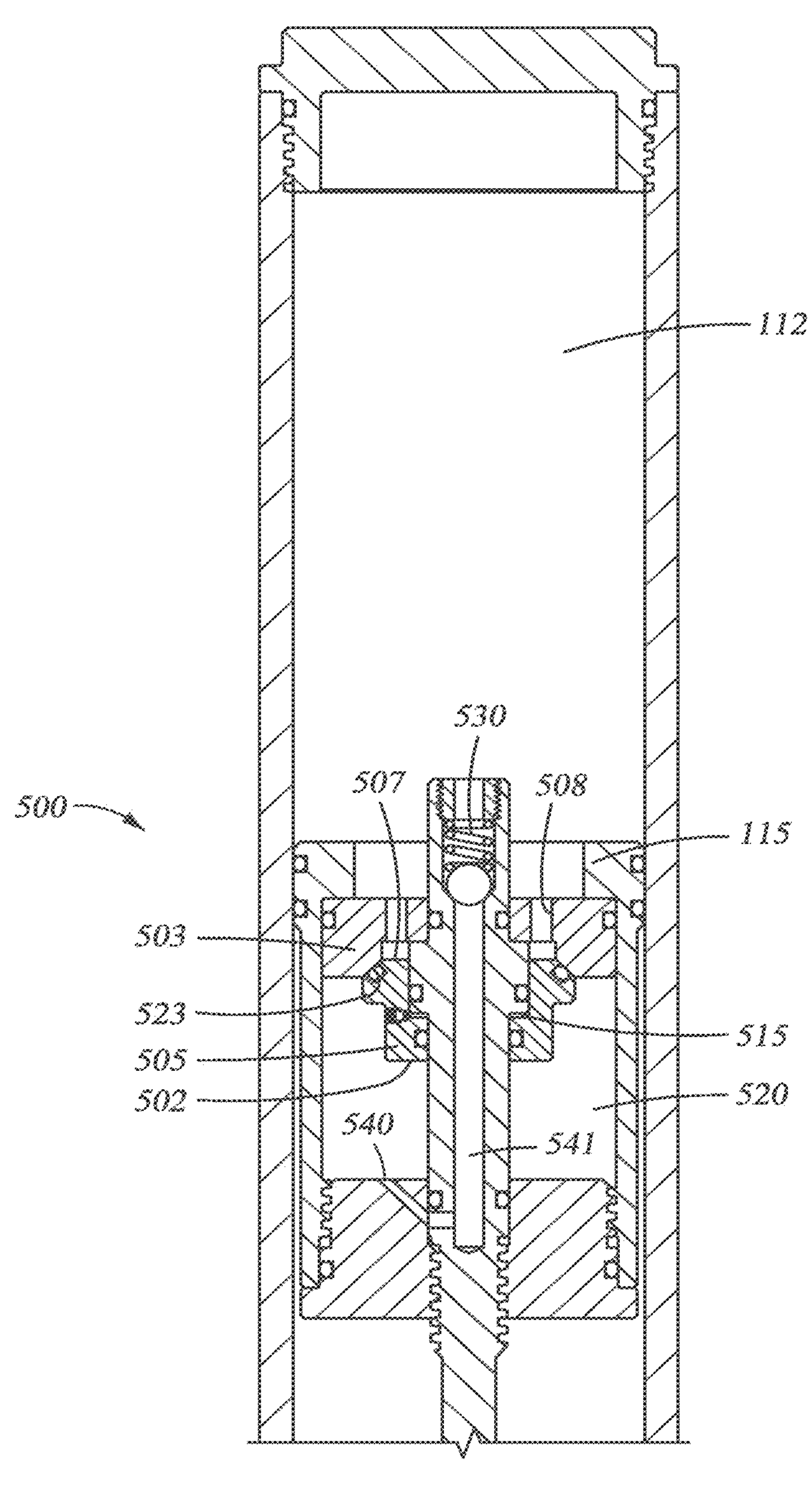
FIG. 5 is another embodiment of a gas spring valve in a gas spring piston.

FIGS. 4 and 5 show embodiments of the valve whereby only two pressurized chambers are used with the addition of a check valve added therebetween. In FIG. 4 for instance, pressurized gas in the main chamber 112 acts upon a first piston surface 407 of a valve piston 405 via apertures 408 formed in the body 403 of the valve 400. Acting opposite the first piston surface 407 is another, larger piston surface 402 adjacent a secondary gas chamber 420 (this embodiment does not include a valve gas chamber). A bleed valve 416 is used to facilitate assembly of the valve 400. At a predetermined pressure in a compression stroke of the gas spring piston 115, the valve piston 405 moves against the pressure of the secondary chamber 420 (and against any resistance brought about by an enlargement of an isolated area 415) and fluid communication is initiated between the two chambers 112, 420. When the valve returns to a "closed" position (shown in FIG. 4) a check valve 430 disposed between the two chambers and preset to open above a certain pressure (as determined by compression of spring 432) in the secondary chamber 420, permits communication between the chambers, thereby ensuring that the secondary chamber 420 is not left with an unsuitably high pressure that might prevent the valve from operating correctly in subsequent cycles. In operation, the check valve opens during a rebound stroke of the piston 115 as pressure in the main gas chamber is reduced. Check valves having spring biased cracking pressures are well known in the art and include an adjustable spring member 432 and a spherical closing member 434 that is locatable on a seat 436 in order to seal or permit fluid from passing through an orifice 438 of valve piston 405 in which the check valve 430 is located.

FIG. 5 is another embodiment of a valve like the one in FIG. 4 but in this embodiment, the valve 500 is disposed in the main gas spring piston 115. The valve includes a movable valve piston 505 having a first piston surface 507 acted upon by pressure in the main gas chamber 112 and an opposing, larger piston surface 502 acted upon by pressure in a secondary chamber 520. The piston 505 is constructed and arranged to remain in a closed position shown in FIG. 5 until pressure in the main chamber 112 acts upon piston surface 507 (via apertures 508) with enough force to move the piston 505 against the opposing force of secondary gas chamber 520 and any resistance of an isolated area 515 formed between the valve piston 505 and the valve body 503. It is noteworthy that while the isolated area often provides resistance to opening by virtue of having a set pressure lower than other system operating pressures, in some embodiments a higher than system pressure is installed in the isolated area thereby allowing it to aid in opening of the valve. Referring again to the embodiment of FIG. 5, once the valve piston moves off a seat 523 in the valve body, fluid communication is permitted between the gas chambers 112, 520, typically towards the end of a compression stroke of the gas spring piston 115. Thereafter, during a rebound stroke, check valve 530 permits higher pressure gas in the secondary chamber 520 to return to substantially equalize (consistent with the spring cracking pressure) with the main chamber 112, thereby preparing the valve 500 to operate in the next cycle. In the embodiment of FIG. 5, the secondary gas chamber 520 communicates with the check valve 530 via a fluid path 540 extending from the chamber through a bore 541 formed in the valve 500.

Figure 6:
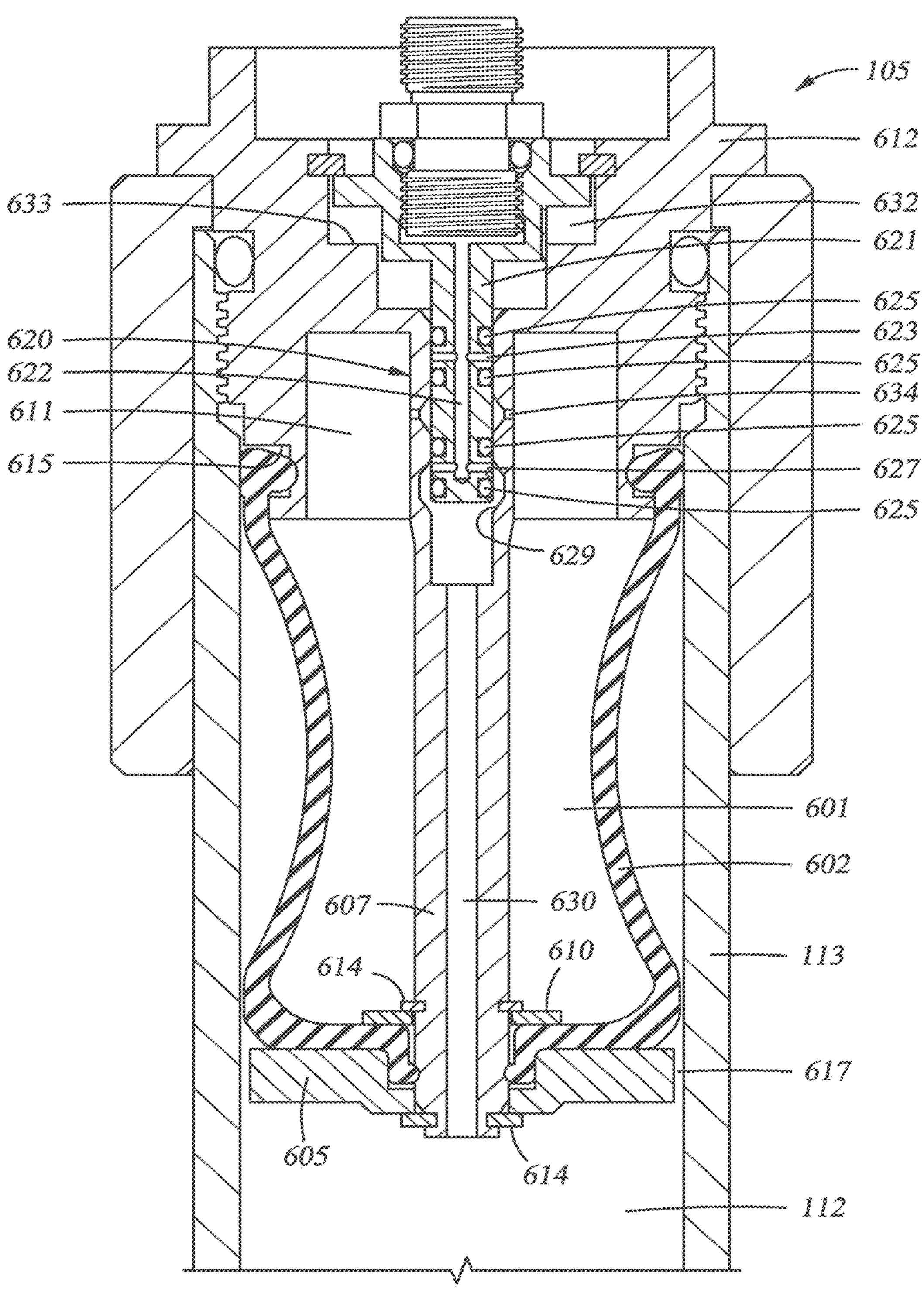
FIG. 6 is a section view of a gas spring wherein a secondary chamber is contained in a bladder.

FIG. 6 shows, in section, another embodiment of portion 'A' of the gas sprung vehicle shock absorber (or gas spring fork leg) of FIG. 1. In one embodiment, a bladder-type member 602 forms a secondary chamber 601 which is separated from a main gas chamber 112 by the bladder 602. An interior of the bladder 602 is initially pressurized to a pressure value higher than the fully extended main gas chamber 112 pressure. When the suspension is extended (and chamber 112 at correspondingly low pressure) the pressurized bladder is constrained from over expansion as previously described. Communication between main chamber 112 and bladder chamber 601 is provided via an annular fluid path (or circumferentially spaced apertures) 617 between the bladder ring 605 and an inner wall of tube 113. The gas chamber compresses during a compression stroke of the fork (or shock) and the pressure therein rises. When the gas chamber 112 pressure becomes equal to the interior bladder pressure, gas in the bladder 602 begins to compress along with the gas in chamber 112 as the compression stroke of the fork spring continues. FIG. 6 shows the bladder 602 in such a partially compressed condition. The addition of the compressing bladder 602 effectively increases the compressing gas volume beginning or "triggered" at a certain suspension compression corresponding to the preselected interior bladder pressure, thereby reducing the slope of the effective spring rate curve for the total spring. When the fork spring is extended during rebound the bladder 602 will expand until it fills the chamber in which it is housed. At that point the bladder will remain at its pre-charged condition while the gas chamber 112 pressure continues to decrease during continued fork extension.

Looking at FIG. 6 in more detail, the bladder 602 has walls formed of a flexible material having enough strength to withstand the pressures and movements expected of it in use. The bladder is located above the main chamber 112 and piston (as shown for example in FIG. 1). An outer wall of the bladder is housed in and retained by the tube wall 113 and an inside wall of the bladder is retained (from over-collapse) by an outer surface of a shaft 607 extending through the upper portion of the fork leg 105 and used to fill the chambers 112, 601 as will be described. At a lower end, the bladder is retained and effectively sealed between bladder ring 605 which supports its lower end and prevents it from "extruding" into the gas chamber 112 therebelow and an upper bladder ring 610, with both rings supported on shaft 607 by retention rings 614.

Another similar pinch-type connection is formed at an upper end of the bladder 602 to seal its perimeter. As shown in the Figure, an upper edge of the bladder is retained in an annular space 615 formed in an outer diameter of fork cap 612. An upper portion, and hence the interior, of the bladder is open to another annular area 611 formed in an interior of the fork cap 612. The separation of the chamber 601 from the main chamber 112 by use of a bladder 602 is advantageous in that no friction due to moving seals (e.g. of floating pistons) is introduced into the system and therefore the transition from compression of the gas chamber 112 to compression of the combined gas chamber 112 and gas-filled bladder 602 is very smooth. Notably, gas in the main chamber 112 need not be the same "gas" or have the same characteristics as gas in the bladder.

In the embodiment of FIG. 6, a multi tank gas fill valve 620 is shown within the top cap 612. In one embodiment, the gas fill valve includes an axially movable filler body 621, having a bore 622 formed substantially along its length but ending as a blind hole in a lower portion thereof. An upper set of radial apertures 623 straddled by O-rings 625 (or other seals) above and below, intersect the bore 622. A lower set of radial apertures 627, straddled by O-rings 625 (or other seals) above and below, also intersect the bore 622 of valve body 621. In its axial upper position (as shown in FIG. 6), gas pressure may be introduced at an upper end of the fork through bore 622 of the filler body 621 (which in one embodiment comprises a Schrader type fill valve depicted as a threaded body extending upwardly from the center of cap 612) where it flows and subsequently exits through unsealed apertures 627 (utilizing a space between the lower O-ring 625 and an upset 629), entering a bore 630 (through the shaft 607) and exiting into the gas chamber 112, thereby increasing pressure in, and "filling," the main gas chamber.

In a second position (not shown), the filler body 621 is moved downward, thereby closing a gap 632 formed between an outwardly extending lip of the filler body and a shoulder 633 of cap 612. In that downwardly shifted position, apertures 623 will be adjacent an apertures 634 formed through a wall of the valve body 621 (with O-rings 625 above and below sealingly straddling aperture 634) and apertures 627 will be located in upset 629 with O-rings 625 above and below sealingly straddling upset 629 (thereby sealing apertures 627 closed against the inner surface of the shaft 607). As such, gas may be introduced into bore 622 where it will flow until it exits though apertures 623 and aligned apertures 634 and into secondary chamber 601, thereby increasing the interior pressure in the bladder 602. As such the valve 620 is essentially a two-position "push/pull" valve that may be used to independently fill two isolated regions of a gas spring.

Figures 8A, 8B:
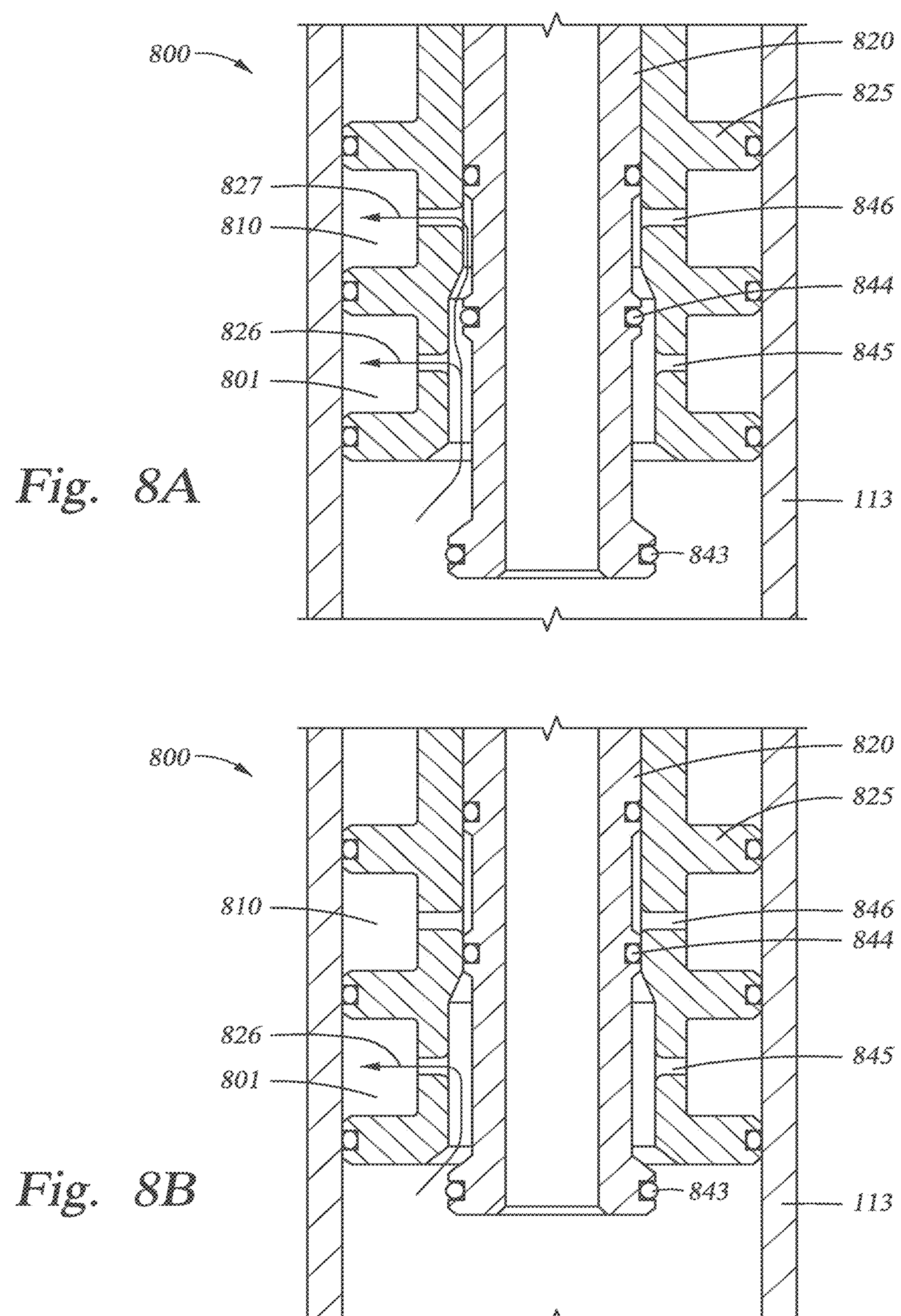
FIGS. 8A and 8B show another embodiment with selectively accessible gas volumes.
Figure 9:
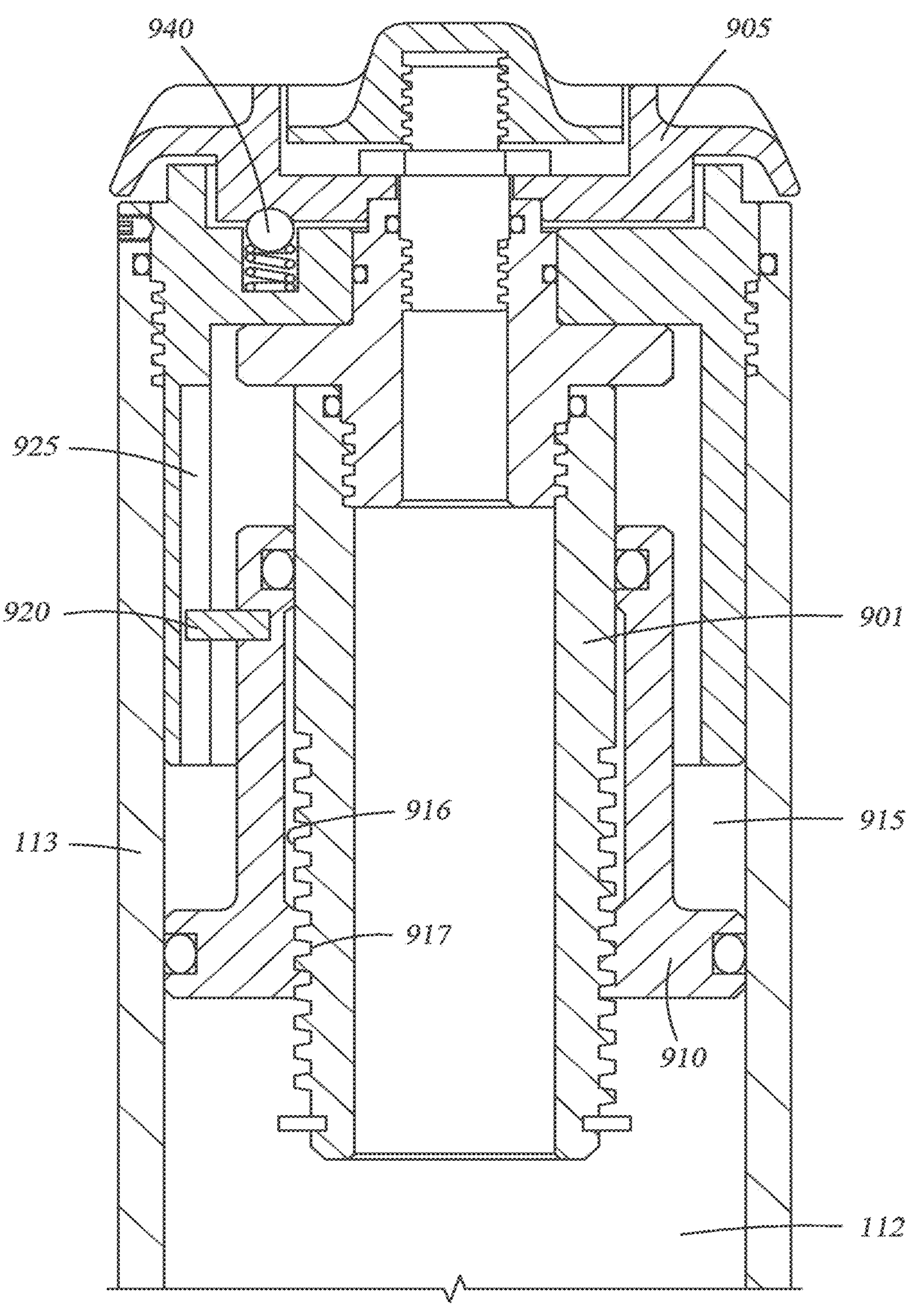
FIG. 9 is another embodiment showing a gas spring with a gas chamber having a user-adjustable volume.

FIGS. 7, 8 and 9 each show, in section, an embodiment of portion 'A' of the gas sprung vehicle shock absorber (or gas spring fork leg) of FIG. 1. FIGS. 7 and 8 show embodiments of a multiple air volume gas spring that each use some form of sequential port straddling where each port optionally straddled communicates with a gas volume. FIG. 9 shows an embodiment that permits a main gas chamber to be enlarged to any size within the range of an adjustment feature.

Figure 7A:
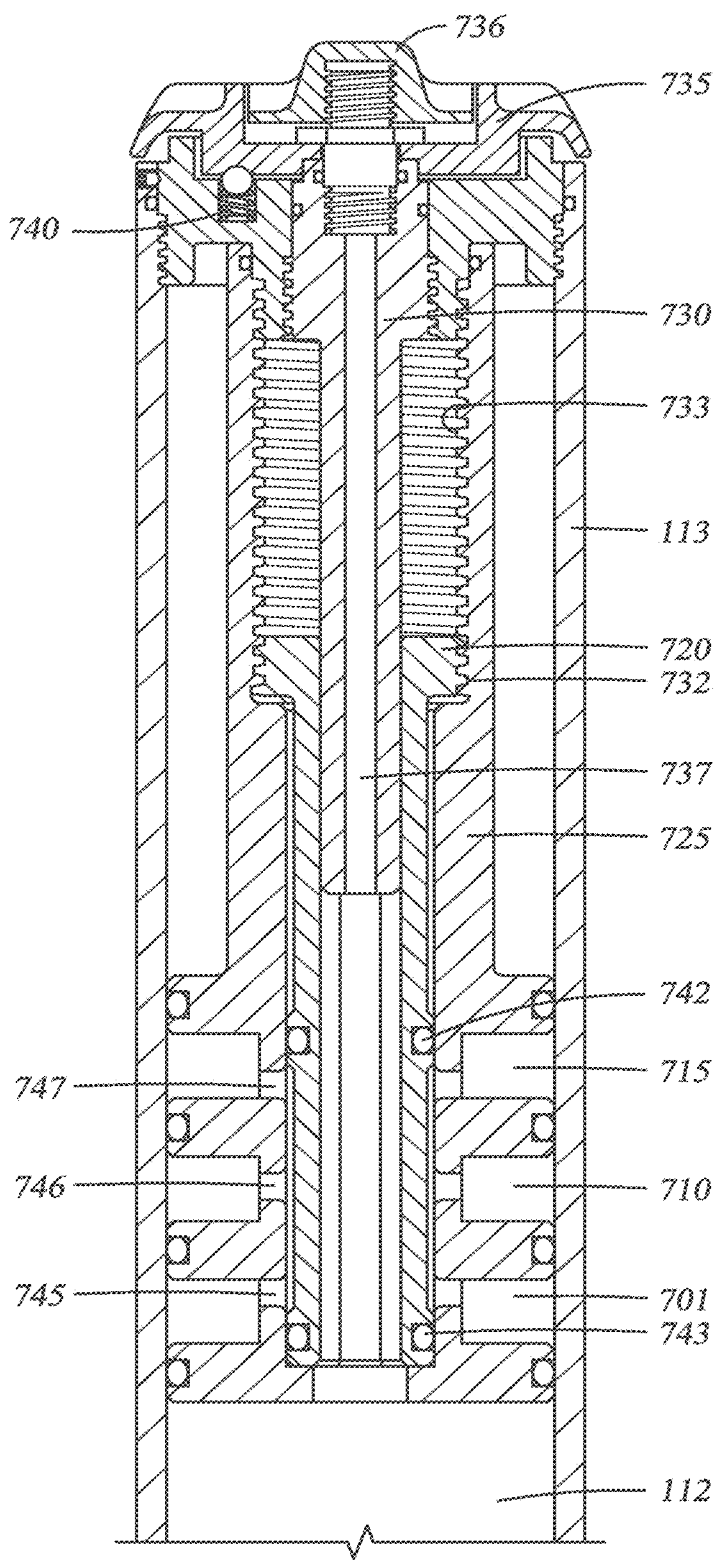
FIGS. 7A and 7B show two positions of a gas spring with selectively accessible gas volumes.

In the embodiment of FIG. 7A, B, for example, an upper portion of a fork tube includes multiple additional gas chambers that can be selectively utilized based upon an adjustment made by a user of the shock absorber. Visible in the Figure is upper tube 113 of a fork, the inside wall of which serves as an outer wall for three additional gas volumes 701, 710, 715. The volumes are selectively put into communication with a main gas chamber 112 based upon the axial position of a chamber sealing screw 720 which includes a spaced pair of straddling seals 742, 743 at a lower end thereof and is axially translatable up and downwards along a multi chamber shaft 725. In the embodiment of FIG. 7A, a hex drive coupler 730 extends downward from an upper end of the fork. The coupler has a cross section male hex shape formed on its outer surface that mates with a cross section female hex shaped surface formed on the interior of the chamber sealing screw 720. The mating hex shapes ensure the two parts 730, 720 are rotationally but not axially fixed together. Specifically, the arrangement permits the hex drive coupler 730 to be rotated, thereby causing the chamber sealing screw 720 to move up or down due to a threads 732 on an outer surface of the screw 720 and mating threads 733 the interior of the multi chamber shaft 725. At an upper end, the hex drive coupler 730 is attached and rotatable by a compression ratio knob 735 located at an upper end of the fork. In the embodiment shown, the rotation of the knob is indexed by a ball and detent arrangement 740 consisting of a spring-loaded ball that seats itself in one of any number of detents that help determine and limit rotational movement of the knob 735 and with it, axial movement of the sealing screw 720. An additional top cap 736 houses a path to pressurize the main chamber 112 via a hollow shaft 737 and typically includes a Schrader valve (depicted as a threaded portion under and within cap 736).

In one embodiment, the chamber sealing screw 720 is moved axially to position upper 742 and lower 743 seals of the screw in sealing straddling arrangement over selected entry ports 745, 746, 747 that correspond to additional spring air volumes 701, 710, 715. Opening of the ports adds their corresponding air volume to the main spring, hence reducing the total spring rate. Conversely, subtracting the ports removes the air volume from the total thereby increasing the gas spring rate of the fork. In FIG. 7A, the gas spring is shown with only the main gas chamber 112 utilized. All of the additional volumes 701, 710, 715 are isolated from the gas chamber 112 due to the position of the lower seal 743 of the chamber sealing screw 720 that is preventing communication with volume 701.

Figure 7B:
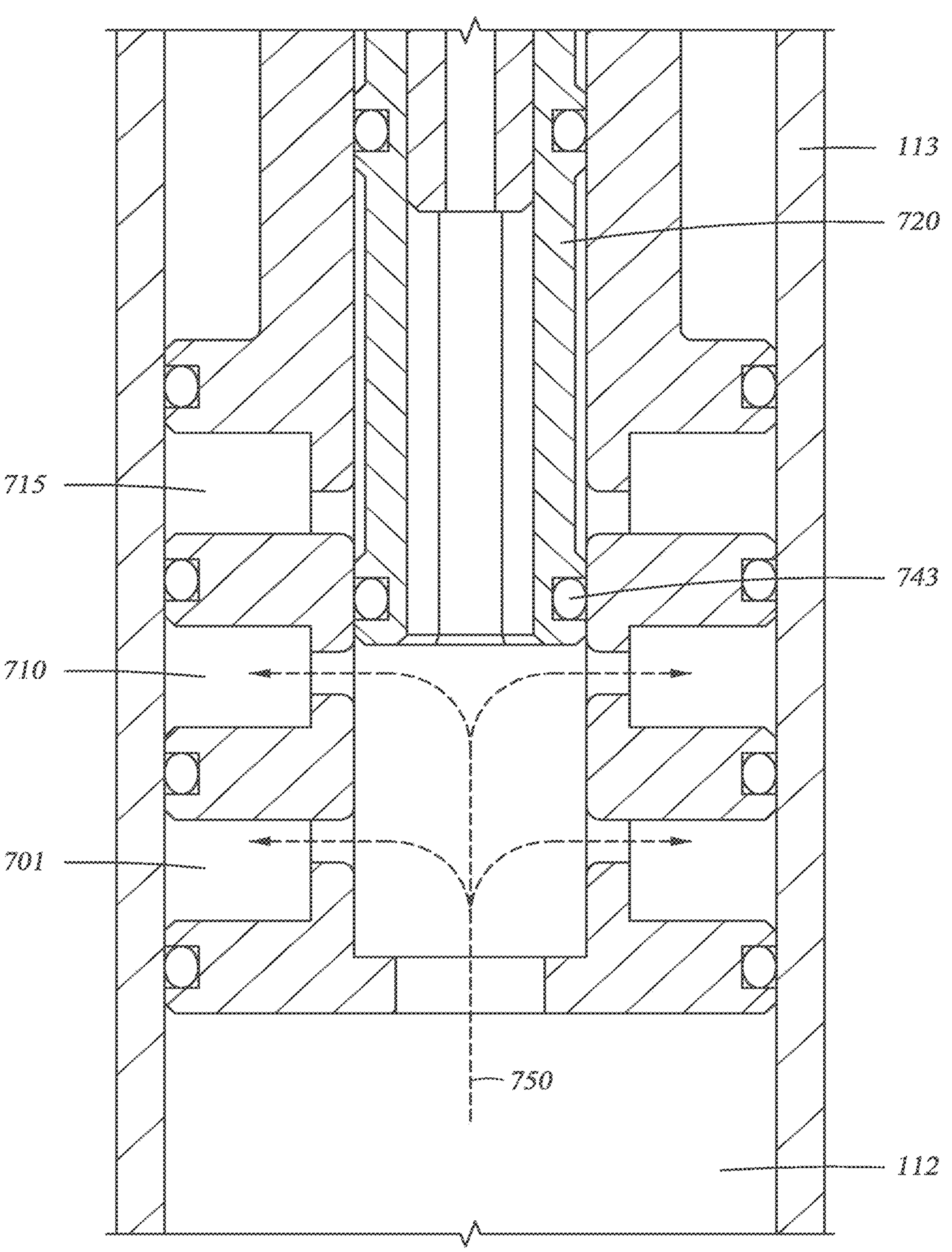

FIG. 7B shows the embodiment of FIG. 7A after the knob 735 (not shown) has been manipulated, thereby rotating the hex drive coupler 730 and causing the chamber sealing screw 720 and seal member 743 to move axially upwards to expose, and thereby add, two volumes 701, 710 to the main chamber 112. The path of air into each volume is illustrated by arrows 750.

FIGS. 8A and 8B show another embodiment of a valve having a user-selectable means of utilizing additional gas spring volumes in order to change spring rate. In the embodiment shown in FIG. 8A, a multi-chamber shaft 825 includes two additional volumes 801, 810 accessible via apertures 845, 846, while an axially adjustable travel adjuster 820 (operationally analogous to and operational as the chamber sealing screw 720 of FIG. 7) includes sealing O-rings having different diameters. The varying diameters of O-rings 843, 844 permit operation of the valve with less axial movement, as compared to the chamber sealing screw 720, between positions. In FIG. 8A both additional volumes 801, 810 are in fluid communication with main chamber 112 via fluid paths 826, 827, and in FIG. 8B only a single volume 801 is being utilized due to the contact of O-ring seal 844 with its corresponding surface of the multi chamber shaft 825. Referring to the FIGS. 8A, B, when seal 843 becomes sealingly engaged with an interior of the chamber shaft 825, all of the optionally additional volumes are isolated from the main chamber 112. Note that indexer (as shown in FIG. 7) may be calibrated to engage detent at appropriate axial relationship seal increments as required. Adjustment of the travel adjuster 820 is typically accomplished with a mechanism similar to that described in relation to FIGS. 7A, B.

In each of FIGS. 7 and 8 the spring rate adjustment is made by user manipulation of an adjustable member. Note that these manually adjustable embodiments may be used in conjunction with "automatic" embodiments disclosed herein (e.g. FIGS. 2-6; 10-12) such that the total spring exhibits a combination of automated (or preset) rate and manually selectable rate adjustments. Further, while one or two additional gas chambers may be shown and described it is understood that in many embodiments more gas chambers may be added in keeping with principles disclosed herein.

In another embodiment as shown in FIG. 9, the total volume of the main gas chamber 112 is infinitely variable (within mechanical limits). A user may rotate a compression ratio shaft 901 (via an adjustment knob 905) thereby axially moving (upward for increased spring volume or downward for decreased spring volume) a compression ratio piston 910. Movement is accomplished with mating threads 916, 917 formed on the two mating portions 901, 910. As in the embodiment of FIG. 7, the knob 905 is provided with a ball and detent mechanism 940. As the ratio piston 910 moves upwards, additional portions of a normally unused and isolated volume 915 are utilized as part of the main chamber 112. In the embodiment of FIG. 9, the ratio piston 910 is keyed (with a key 920 and slot 925) to a wall of the fork tube 113 in order to ensure it remains rotationally located, so that the threads 916, 917 will turn relatively, as the compression ratio shaft 901 moves along it axially.

Figure 10:
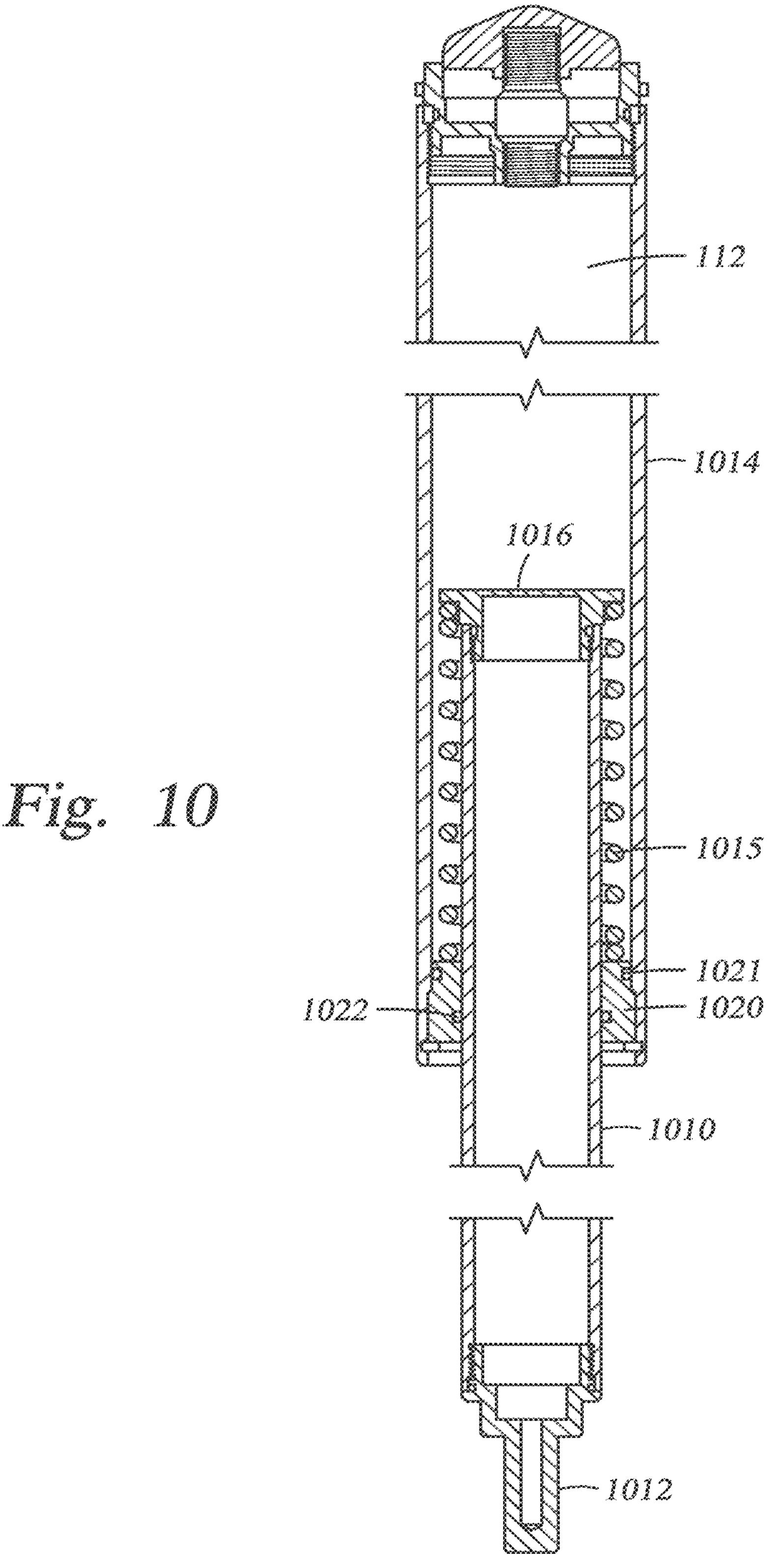
FIG. 10 is a section view of a gas spring wherein a main gas chamber is compressed due to the location of a shaft assembly.

In one embodiment, as shown in FIG. 10, the piston rod 1010 (see FIG. 1) is hollow, referred to as lower air shaft assembly, and includes a secondary air volume. However, in FIG. 10, the lower leg portion of the fork is not shown in order to more clearly illustrate a lower air shaft assembly 1010 which is effectively fixed at a lower end 1012 to the front wheel (not shown) of the vehicle and moves in and out of the upper tube portion 1014 with the lower leg portion as a main gas chamber 112 is compressed in operation. In one embodiment, the compression of the main gas chamber is achieved by introduction of the volume of the lower air shaft assembly 1010 into the volume of the main chamber 112 during a compression stroke. As such, the "piston" portion 1016 of the lower air shaft assembly need not sealingly engage the inner surface of the upper tube 1014, thereby eliminating a dynamic seal. Rather the lower assembly 1010 is sealed at a lower end of the tube 1014 by a sealhead 1020 having O-ring seals 1021, 1022 on an inner and outer surface thereof. The embodiment of FIG. 10 also includes a mechanical "negative" spring 1015 that is compressed between piston 1016 and sealhead 1020 of the main gas chamber 112. Negative springs urge a gas spring like the one shown towards compression and are useful in smoothing the initial movement of an air spring. As illustrated by the Figure, the embodiment shown uses a volume of a rod, rather than a sealed piston to compress gas in a main chamber (although either may be used as the compression mechanism). In this manner, an annular area between the rod of the shaft assembly 1010 and an inner surface of upper tube 1014 buffers the compression of the gas in the main gas chamber 112.

Figure 11:
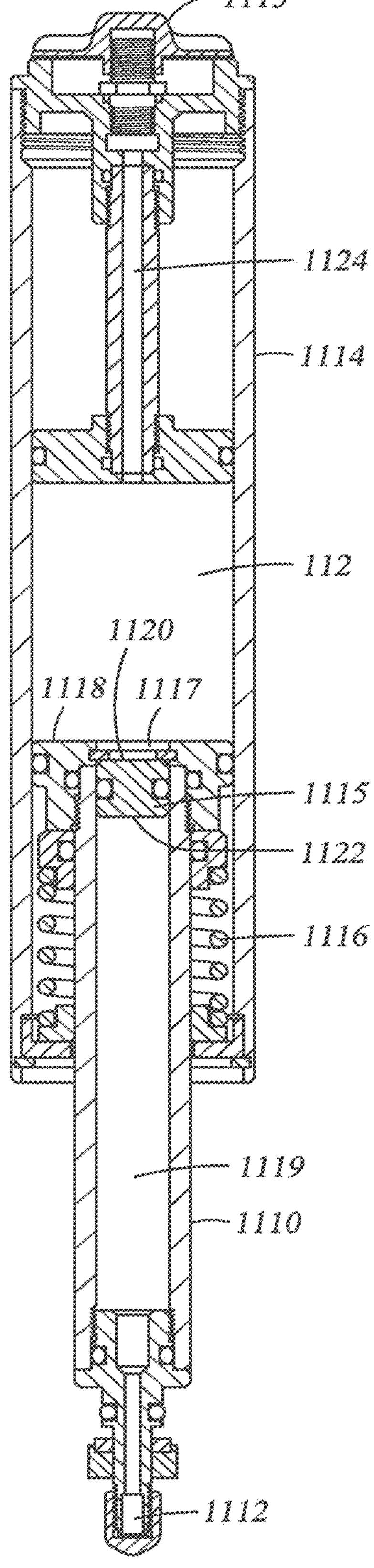
FIG. 11 is a section view of a gas spring having two gas chambers and a floating member that moves to enlarge or reduce a gas volume of the main chamber.

FIG. 11 shows an embodiment of a spring leg (FIG. 1). Like the other embodiments, the fork leg 1114 includes a filling means at an upper end 1113 thereof typically including a Schrader valve and a fluid path 1124 extending to a main gas chamber 112. Like the embodiment of FIG. 10, an outer, lower tube is not shown so that a lower portion of the assembly can be illustrated more clearly. In one embodiment, a lower air shaft assembly 1110 includes an internal floating piston 1115 disposed at a first end thereof and in fluid communication with a main gas chamber 112 via an aperture 1117 formed in a main air piston 1118. As with the embodiment of FIG. 10, the spring leg is equipped with a negative spring 1116 to initiate compression. In one embodiment, the lower air shaft 1110 includes an gas chamber 1119 which is initially pressurized to a value higher than that of the main chamber 112. As the main chamber 112 is compressed during a compression stroke of the suspension, the pressure therein increases until it equals the preset pressure inside the air cylinder 1119. Subsequently, as the pressure in the main chamber incrementally rises beyond that of the lower cylinder, the floating piston 1115 begins to move in the direction of a lower end 1112 of the lower air shaft 1110, thereby transferring incrementally increased pressure to the air cylinder 1119 and correspondingly including its volume in a total air volume of the fork spring. As with other embodiments, the piston surfaces 1120, 1122 on each side of the floating piston 1115 can be designed, along with the beginning pressures in each chamber 112, 1119, to effectively "tune" the gas spring to desired characteristics.

Figure 12:
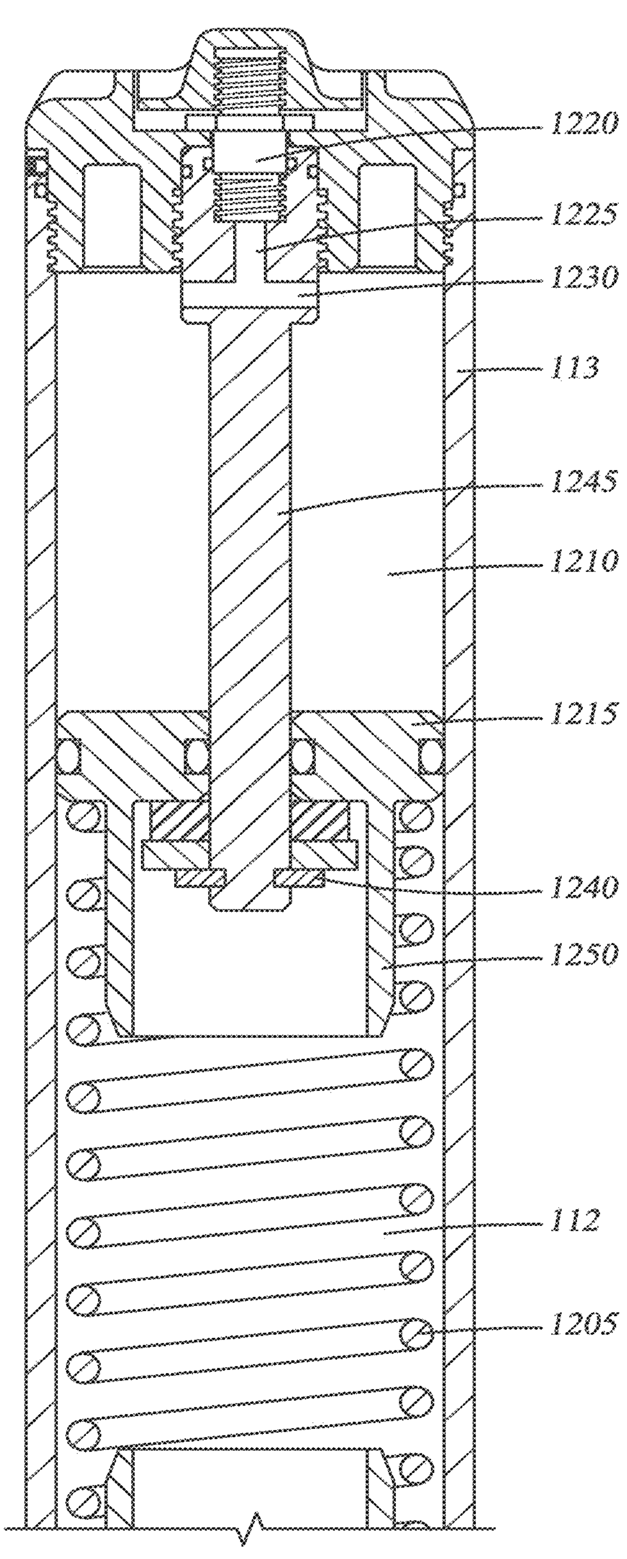
FIG. 12 is a section view showing an embodiment of a combination gas and coiled spring.

In one embodiment shown in FIG. 12, a main chamber 112 includes a helically wound (or other) mechanical spring 1205. The helical spring can either act alone in the chamber 112 or can augment pressurized gas in the chamber. For example, in one embodiment, the chamber 112 also includes compressed air at a predetermined pressure whereby, in a compression stroke, both the gas and helical spring 1205 work together to determine an overall spring rate. In one embodiment, the function of the main spring is performed solely by the mechanical spring. The main chamber 112 is typically fillable through a fill valve located at a lower end of the fork (not shown). In an upper area of the tube 113 is a secondary gas chamber 1210 constructed and arranged to be compressed as a sealed main gas piston 1215 moves into the chamber 1210 during a compression stroke of the main spring. A fill means 1220, typically including a Schrader valve provides a path 1225 with apertures 1230 for pressurizing the secondary chamber 1210. In one embodiment, a shaft 1245 extends along the center of the tube 113 and terminates in a top out ring 1240 to retain the piston 1215 in its initial position prior to compression. An integrated spring guide 1250 ensures the helical spring 1205 stays centered in the tube 113.

In one embodiment, the main spring and gas chamber pressure(s) are arranged and set whereby during a first half of compression stroke, only (or substantially) the helical spring 1205 will determine the spring rate. Thereafter, in a later part of the stroke, the gas portion(s) will determine the spring rate after the spring 1205 compresses to a point where the air piston 1215 begins to move significantly upwardly, thereby compressing the gas in the secondary air cylinder 1210 and affecting the spring rate of the total compound spring.

Figure 13A:
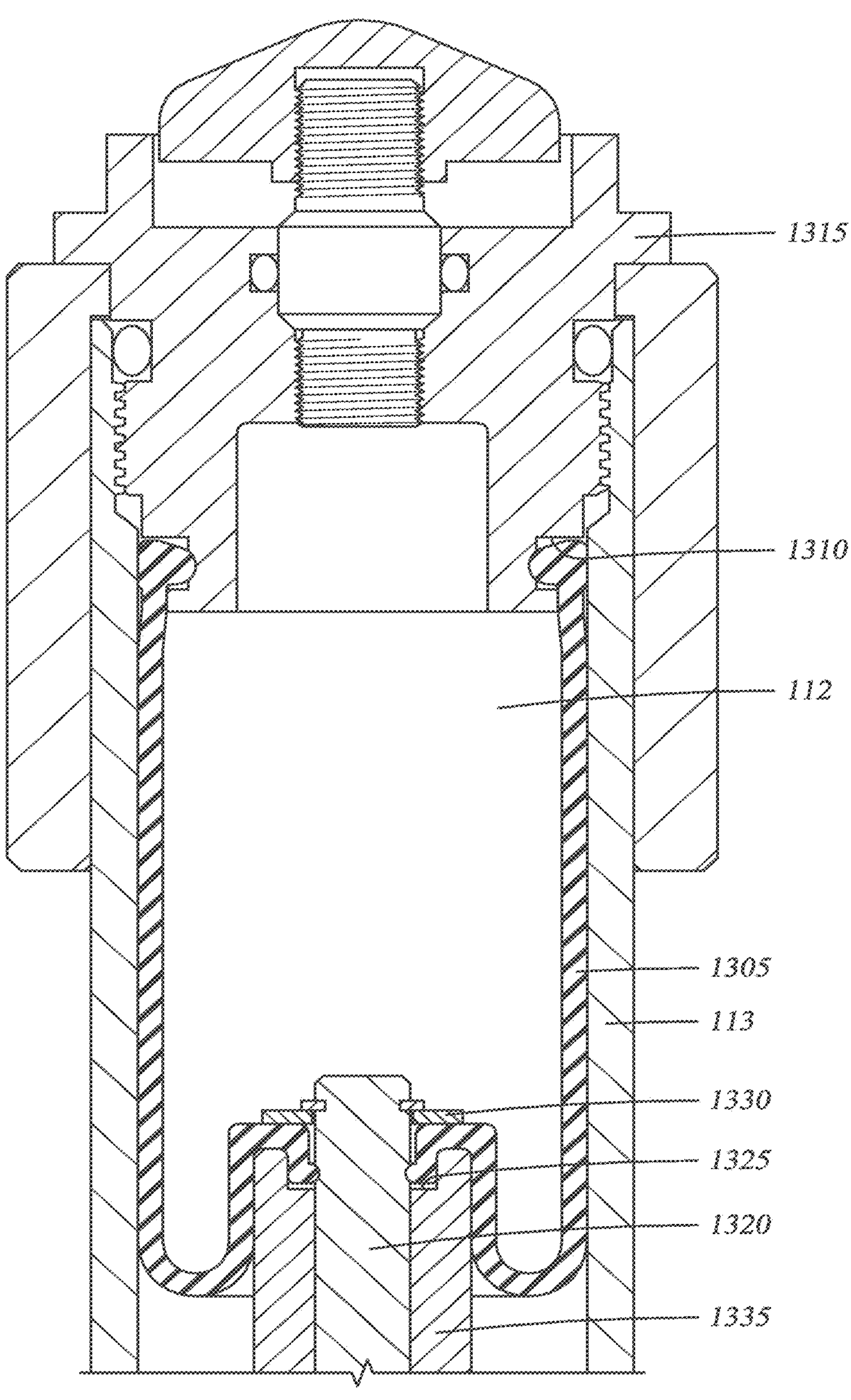
FIGS. 13A-B are section views showing an embodiment that utilizes a diaphragm in a main gas chamber.
Figure 13B:
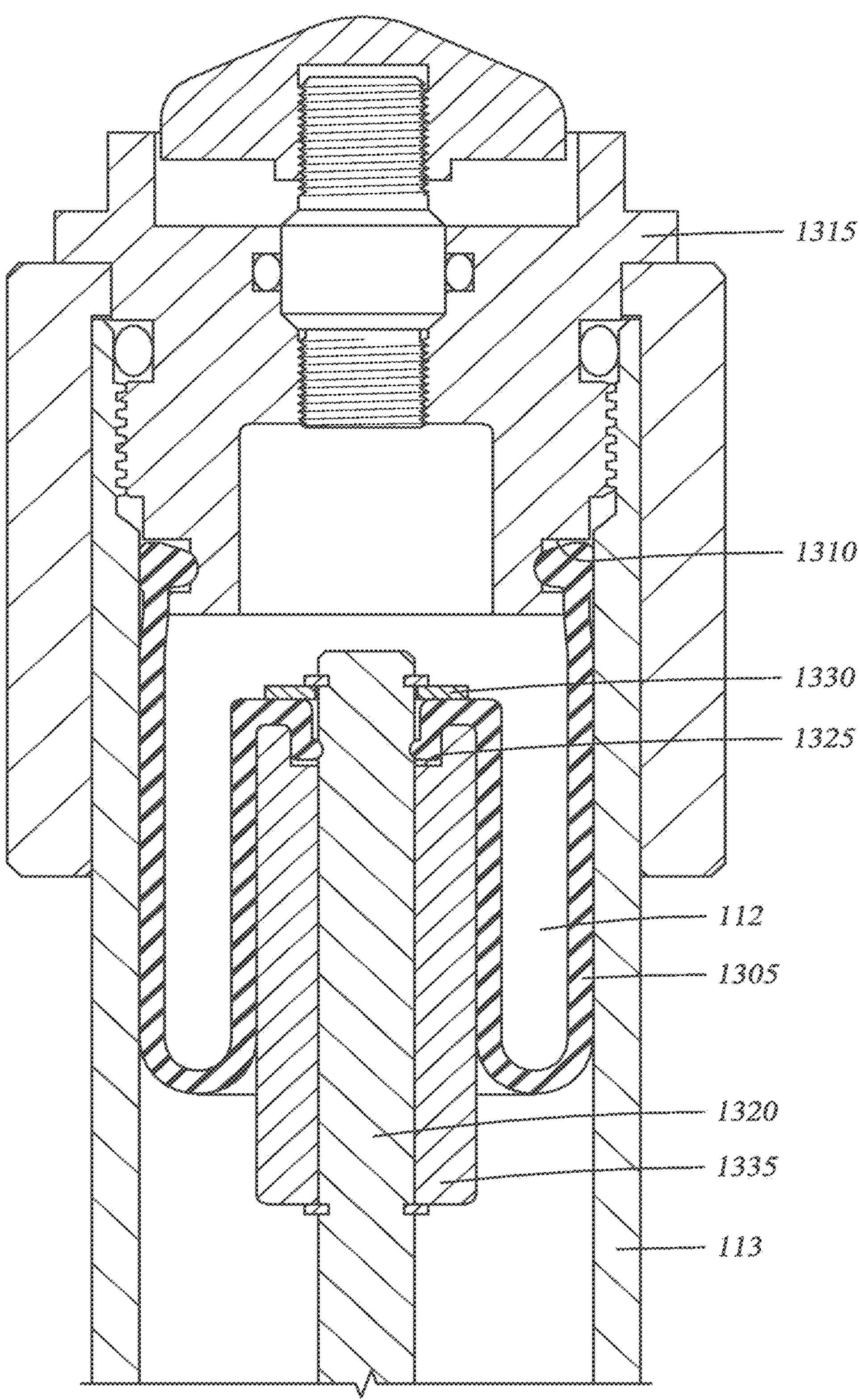

FIGS. 13A-B illustrate an embodiment of a "rolling diaphragm" or bladder for isolating (sealing) a main gas chamber of a suspension air spring. The gas spring in FIG. 13A is shown in a fully extended position and in FIG. 13B is shown in a compressed state. Like the bladder embodiment of FIG. 6, this type of isolated volume is advantageous because it requires no dynamic seals and as such is relatively frictionless and responsive and will operate very smoothly.

As shown in the Figures, an upper fork tube 113 forms a main gas chamber 112 by supporting a flexible bladder or diaphragm 1305 housed therein. The diaphragm is under pressure, allowing it to extend downwardly in the tube when the air spring is in a retracted position as in FIG. 13A. An upper end of the diaphragm 1305 is retained in an annular area 1310 formed in a top cap 1315. At a lower end, the diaphragm 1305 is abutted by and, in the embodiment shown, attached to an upper end of a plunger or piston 1320 where it is housed in an annular area 1325 formed around a piston cover 1335 and retained by a ring 1330. The piston is attached via a piston rod, to a lower leg (not shown but visible in FIG. 1). A valve in the top cap 1315 provides a means of filling the diaphragm 1305 to a pre-compression pressure.

As the suspension compresses (during a compression stroke) and the upper tube 113 moves into the lower leg, the piston 1320 begins to impinge upon and deform (essentially "turn inside out") an end of the diaphragm 1305. As is shown in FIG. 13B, the diaphragm essentially turns in on itself and the volume interior of the diaphragm (i.e. the main gas chamber) is decreased by the volume of the impinging piston. The piston cover 1335 comprises in whole or in part a flexible material such an elastomer that will make it more robust and reduce side loading of the diaphragm 1305 by the piston 1320. The cover also serves to enlarge a diameter of the piston and make its volume more effective in compressing the diaphragm. The cover 1335 also may include centering ribs (not shown) which are rigid enough to guide the piston along the inner surface of the upper tube rather than the side surfaces of the rolled diaphragm 1305.

Figure 14:
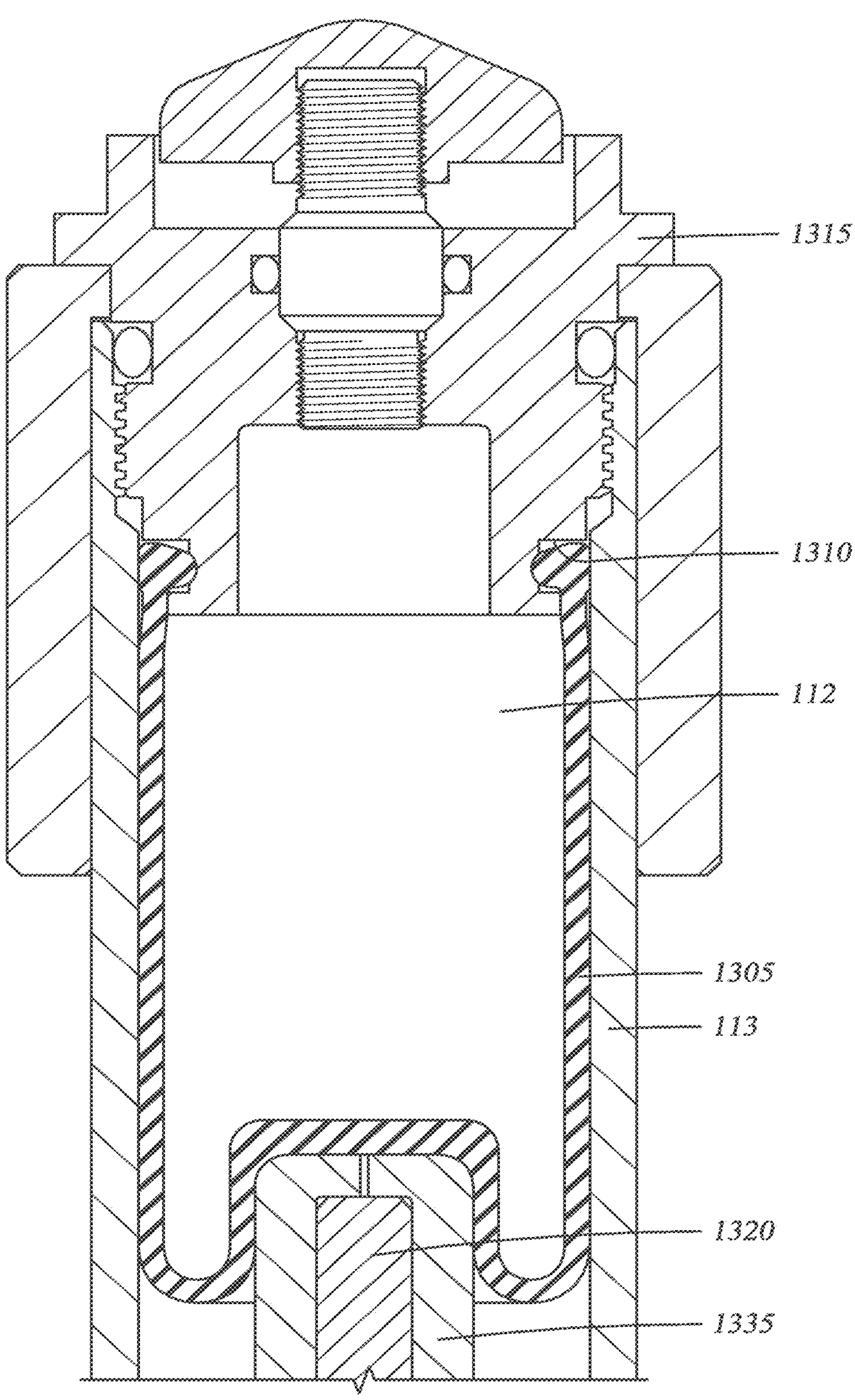
FIG. 14 is another embodiment of the gas spring of FIGS. 13A-B.

FIG. 14 is another embodiment of the gas spring of FIGS. 13A-B. Like the device of FIG. 13, the spring includes a main chamber 112 with a diaphragm 1305 disposed therein and is illustrated in its pre-compression position. Unlike the embodiment of FIG. 13, the diaphragm in FIG. 14 is not mechanically attached to the piston/piston cover 1320, 1335 at a lower end. Rather, the diaphragm is free to be further deformed simply by the movement of the piston in the compression stroke.

Figure 15:
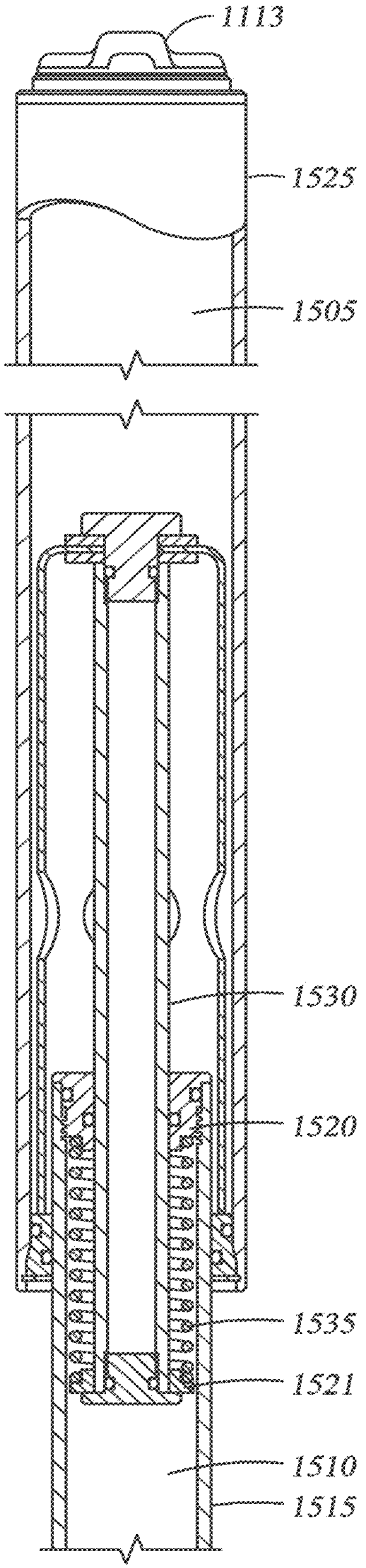
FIG. 15 is a section view showing another embodiment.

In one embodiment, as shown in FIG. 15, a gas spring assembly includes a main gas chamber 1505 as well as a secondary chamber 1510 housed in a lower air shaft 1515. The lower air shaft is equipped with a piston 1520 at one end for compressing gas in the main chamber 1505 as the lower air shaft 1515 extends into the upper tube 1525 during a compression stroke. Disposed in the piston 1520 in a slidable relationship is a spring shaft 1530. The shaft is constructed and arranged to add and subtract volume from the two chambers 1505, 1510 as the gas spring operates. For example, in one embodiment, in a retracted state, the secondary gas chamber 1510 is at higher pressure than the main chamber 1505 and is therefore urging the slidable spring shaft 1530 into the main chamber 1505 (against a coil spring 1535 that is disposed between the piston 1520 and a stop 1521). As the gas spring operates in a compression stroke, the spring shaft 1530 and its volume move into the main chamber and displace gas therein, thereby increasing the gas pressure in the main chamber 1505 until the main chamber is at a pressure equal to that of the secondary chamber 1510. At that point (due to force of the spring 1535) the spring shaft 1530 moves back into the secondary chamber 1510, thereby permitting an enlargement of the main chamber volume by an amount equal to the volume of the spring shaft 1530 that has moved out of the main chamber 1505. In this manner, the volume of the main chamber can be increased or decreased in an "automatic" fashion as the gas spring operates. Because each chamber 105, 1510 can be preset with differing gas pressures, the spring can be tuned to operate according to the needs of a user.

Figure 16:
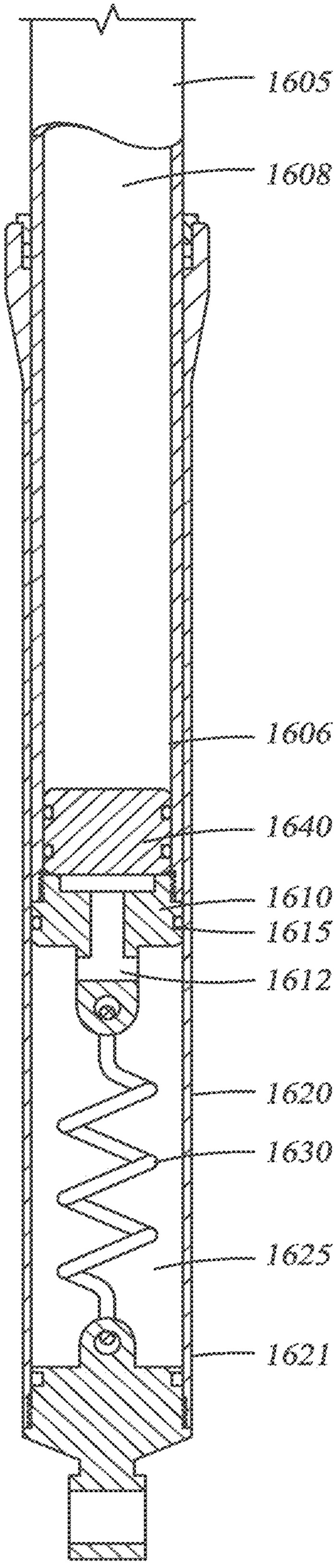
FIG. 16 is a section view showing yet another embodiment.

In one embodiment, as shown in FIG. 16 a gas spring includes an upper tube 1605 having a lower end 1606 partially sealed by a piston 1610 having an O-ring 1615 or other suitable dynamic seal around an exterior thereof. During compression of the fork leg, the piston moves downward into a lower leg 1620, thereby compressing the main gas chamber 1625 and providing spring force resisting compression. The main chamber 1625 has a user selected and suitable initial pressure value. In one embodiment, a mechanical spring 1630 is connected between a lower end of the piston 1610 and a lower end 1621 of the lower leg 1620 such that the spring 1630 is in tension when the gas spring is extended. The mechanical spring 1630 thereby urges the upper tube 1605 downward, or the lower leg 1620 upward relatively (as it is only relative movement that is urged) from its fully extended position, thereby performing as a "negative" spring as described with reference to previous embodiments.

In the embodiment shown, the piston 1610 includes an aperture 1612 therethrough whereby gas is communicated between the main gas chamber 1625 and a secondary gas chamber 1608. The aperture permits gas to act on a floating piston 1640 disposed in the upper tube in a manner whereby the floating piston will move further into and partially out of the secondary gas chamber 1608, thereby permitting the main gas chamber 1625 to be enlarged or reduced as the gas spring operates. In one embodiment, secondary gas chamber 1608 is initially charged to a higher pressure than main gas chamber 1625, whereby both pistons 1610, 1640 initially operate as one during an initial compression stroke. Thereafter, as gas pressure in the main gas chamber 1625 increases to a level of both the pressure of the secondary gas chamber 1608, floating piston 1640 will move upwards into secondary gas chamber 1608. In one embodiment, (not shown), an automatic, pressure-actuated valve like the one shown in 2A, B is installed at an upper end of the upper tube 1605. As described in reference to FIGS. 2A, B, the valve is constructed and arranged to "open" when pressure in the secondary chamber 1608 rises to a predetermined level, thereby providing another chamber and enlarging the size of the secondary gas chamber 1608 and/or the size of the main gas chamber 1625.

In one embodiment, a manually selectable secondary and/or tertiary (or further) gas chamber (e.g. FIGS. 7-9) are positioned at an upper 'A' portion of the fork leg (FIG. 1) to augment the secondary gas chamber within the upper tube (or to act as a secondary, etc. in the event that the floating piston is absent and the upper tube chamber and "main" chamber are merely communicated and experience a decreasing total volume upon compression).

While the embodiments have been described separately, they can be combined and need not be located in a particular fork leg. For example, considering the fork of FIG. 1, a fluid flow could traverse (e.g. either interior to or attached to) a fork crown between the two fork legs, thereby establishing a fluid communication path between the legs. As such, additional damping chambers may be located in the gas spring leg (or the gas spring pressure may be used to enhance dampening) or additional gas volumes may be located in the dampening leg and communicated (additively as described herein) to the gas volumes of the total gas spring.

While the foregoing is directed to embodiments of the present invention, other and further embodiments of the invention may be devised without departing from the scope thereof, and the scope thereof is determined by the claims that follow.

What is claimed is:

1. A gas spring system for use in a suspension system, comprising:

a first chamber having a mechanical spring member therein, said mechanical spring member compressible in a compression stroke of said suspension system, said first chamber configured to contain a gas therein, wherein, in said compression stroke, both said gas and said mechanical spring together to determine a spring rate of said first chamber, and wherein said mechanical spring member primarily forms said spring rate of said first chamber over a first portion of said compression stroke;

a second chamber isolated from the first chamber, the second chamber having gas therein, the gas in said second chamber compressible in the compression stroke, said second chamber isolated from said first chamber;

wherein said spring rate of said first chamber and the gas in said second chamber jointly form a spring rate of said gas spring system in the compression stroke;

a shaft extending along a center of said suspension system, wherein said shaft extends through said second chamber;

a piston coupled with said shaft, wherein said piston does not sealingly engage an inner surface of said second chamber; and wherein said first chamber is fillable through a first fill valve located at a lower end of said suspension system.

2. The gas spring system of claim 1, further comprising: a spring guide integrated into said suspension system.

3. The gas spring system of claim 2, wherein said spring guide is configured to ensure said mechanical spring member remains centered in said first chamber.

4. The gas spring system of claim 1, wherein said gas in said second chamber is pressurized.

5. The gas spring system of claim 1, wherein said second chamber is isolated from said first chamber such that said gas in said second chamber is not permitted to flow into said first chamber during operation of said gas spring system.

6. The gas spring system of claim 1, wherein said gas in said second chamber primarily forms said spring rate over a second portion of said compression stroke.

7. The gas spring system of claim 1, wherein said shaft terminates in a top out ring disposed in a piston.

8. The gas spring system of claim 7, wherein said shaft and said top out ring are configured to retain said piston in an initial position prior to said compression stroke.

9. The gas spring system of claim 1, wherein said gas spring system is disposed in a front fork of a bicycle.

10. The vehicle suspension system gas spring of claim 9, wherein the front fork also includes a fluid damper.

* * * * *